(12) United States Patent
Toyoda

(10) Patent No.: US 6,835,007 B2
(45) Date of Patent: Dec. 28, 2004

(54) DRIVING APPARATUS, SHUTTER APPARATUS AND CAMERA

(75) Inventor: Yasuhiro Toyoda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/662,760

(22) Filed: Sep. 15, 2003

(65) Prior Publication Data

US 2004/0076422 A1 Apr. 22, 2004

(30) Foreign Application Priority Data

Sep. 20, 2002 (JP) ........................................ 2002/275704
Sep. 20, 2002 (JP) ........................................ 2002/276041

(51) Int. Cl.$^7$ .............................................. C03B 9/00
(52) U.S. Cl. ..................................... 396/443; 396/489
(58) Field of Search .............................. 396/357, 358, 396/443, 444, 489

(56) References Cited

U.S. PATENT DOCUMENTS 3,810,224 A * 5/1974 Kitai et al. .................. 396/493
4,455,072 A * 6/1984 Fujino et al. ................ 396/358
6,071,019 A * 6/2000 Shimada ..................... 396/456

FOREIGN PATENT DOCUMENTS

JP   S62(1987)-17737   4/1987
JP   H4(1992)-19730    4/1992

* cited by examiner

Primary Examiner—David M. Gray
(74) Attorney, Agent, or Firm—Cowan, Liebowitz, & Latman, P.C.

(57) ABSTRACT

A driving apparatus having a small charging load, capable of reducing the size of the appratus is disclosed. A present invention discloses a driving apparatus comprises a driving source, a driven member, an energizing member which energizes the driven member in a predetermined direction, a lever member rotatable by receiving the driving force from the driving source at an input portion, which contacts and charges the driven member and a main body which includes a first engaging portion and a second engaging portion and supports the lever member.

15 Claims, 36 Drawing Sheets

TABLE OF LEVER MEMBER INPUT LOAD

| ROTATION ANGLE OF DRIVEN MEMBER [deg] | 0 | 10 | 18.5 | 18.5 | 33 | 44 |
|---|---|---|---|---|---|---|
| F OF FIRST EMBODIMENT [gf] | 2.62 | 2.88 | 3.52 | 3.94 | 9.6 | 23.5 |
| F OF CONVENTIONAL TECHNOLOGY [gf] | 2.92 | 3.07 | 3.63 | 3.63 | 9.29 | 24.7 |

COMPLETION OF RUNNING TO START OF CHARGING

FIRST HALF OF CHARGING

MIDPOINT OF CHARGING (SWITCHING OF AXIS)

SECOND HALF OF CHARGING

IMMEDIATELY BEFORE COMPLETION OF CHARGING

OVERCHARGE

COMPLETION OF CHARGING TO START OF CHARGING

MIDPOINT OF CHARGING

SECOND HALF OF CHARGING

IMMEDIATELY BEFORE COMPLETION OF CHARGING

OVERCHARGE

DRIVING APPARATUS, SHUTTER APPARATUS AND CAMERA

BACKGROUND OF THE INVENTION

1. Field of the Invention

The present invention relates to a driving apparatus, shutter apparatus and camera which moves a driven member having a moving load from an initial position of charging to a position of completion of charging against the load.

2. Description of Related Art

A conventional charge mechanism which moves a driven member having a moving load from an initial position of charging to a position of completion of charging against the moving load is constructed in such a way that a lever member 401 rotates about one rotation axis as shown in FIG. 23.

With reference to FIG. 23 which is a perspective view showing an entire conventional charge mechanism, the conventional charge mechanism will be explained in detail.

Reference numeral 401 denotes a lever member which is supported in a manner rotatable about an axial portion 402a laid on a first base plate 402 as the rotation axis, pressed in the thrust direction of the axial portion 402a by a dropout prevention member (not shown) with a tiny gap. Reference numeral 401a denotes an input side arm portion of the lever member 401, 401b denotes an input pin laid in an integrated fashion on the input side arm portion 401a and 401c denotes an output side arm portion of the lever member 401.

Reference numeral 403 denotes a driven member, which is supported in a manner rotatable about an axial portion 402b laid on the first base plate 402 as the rotation axis, pressed in the thrust direction of the axial portion 402b by a dropout prevention member (not shown) with a tiny gap. At one end of the driven member 403, the axial portion 403a is laid in an integrated fashion and a roller 404 is attached in a manner rotatable about the axial portion 403a as the rotation axis. The dropout prevention member (not shown) acts on the roller 404 in the same way.

Reference numeral 405 denotes a power spring (torsion spring) located on the driven member 403 in such a way as to be coaxial with the axial portion 402b and its one end contacts a spring stopper 402c laid on the first base plate 402 and its other end contacts a spring stopper 403b of the driven member 403 and gives the driven member 403 clockwise torque about the axial portion 402b as the rotation axis.

Reference numeral 406 denotes a charge input lever and is supported in a manner rotatable about an axial portion 407a as the rotation axis, laid on a second base plate 407 which is placed orthogonal to the first base plate 402 and pressed in the thrust direction of the axial portion 407a by a dropout prevention member (not shown) with a tiny gap. Reference numeral 406a denotes an input side arm portion of the charge input lever 406 and receives a force Fch which rotates the charge input lever 406 counterclockwise about the axial portion 407a as the rotation axis to charge this charge mechanism.

Reference numeral 406b denotes an output side arm portion of the charge input lever 406. 406c denotes an output pin laid in an integrated fashion on the output side arm portion 406b, which contacts the input pin 401b of the lever member 401 and transmits power to the lever member 401. Reference numeral 408 denotes a return spring, one end of which is supported by a spring stopper portion 407b laid on the second base plate 407 and the other end of which is hooked on to a hole 406d of the charge input lever 406. Hereby the return spring 408 gives the charge input lever 406 clockwise torque about the axial portion 407a as the rotation axis.

Reference numeral 407c denotes a stopper provided on the second base plate 407 which contacts the side of the output side arm portion 406b of the charge input lever 406 and blocks the clockwise rotation of the charge input lever 406 by the return spring 408.

Then, the operation of the conventional charge mechanism in the above described configuration will be explained.

First, when a force Fch is applied to the input side arm portion 406a of the charge input lever 406, the charge input lever 406 rotates counterclockwise about the axial portion 407a as the rotation axis. In this way, the input pin 401b on the input side arm portion 401a is pressed by the output pin 406c on the output side arm portion 406 and the lever member 401 rotates clockwise about the axial portion 402a as the rotation axis. This causes the output side arm portion 401c of the lever member 401 to press the roller 404 against the force of the power spring 405 and rotate the driven member 403 counterclockwise about the axial portion 402b as the rotation axis.

Then, charging is finished when the driven member 403 has rotated by a predetermined angle.

Then, the operation of the conventional charge mechanism will be explained in detail with the state of a charging load in operation taken into consideration. The power spring 405 is a torsion spring but it will be expressed as a tensile coil spring in the figures used in the following explanations as required.

FIG. 24 is a plane view of charge mechanism (charge input lever 406 placed on the second base plate 407, etc., is omitted) indicating the lever member 401 and the driven member 403 placed on the first base plate 402 when charging is started, and both the rotation angle of the lever member 401 (driving member) and the rotation angle of the driven member 403 are 0°.

In the same figure, components have dimensions as indicated in the figure and suppose the rotation moment that the power spring 405 gives to the driven member 403 is $k\theta 1$ when charging is started. Here, k denotes a spring constant of the power spring 405 per unit rotation angle when the driven member 403 rotates. Furthermore, $\theta 1$ denotes a displacement angle from a free state of the driven member 403.

F in the figure denotes a force that the input pin 401b of the lever member 401 receives from the output pin 406c of the charge input lever 406 to balance with $k\theta 1$, P10 denotes the force that the roller 404 receives from the output side arm portion 401c of the lever member 401, which is equal to a reaction force by the force of the power spring 405 that the output side arm portion 401c of the lever member 401 receives through the roller 404.

From a balance relationship between forces, the following expressions are obtained. Here, for simplicity of explanation, frictions of various portions are ignored.

$$(F \cdot \cos 29.16°) \times 3.90 = P10 \times 5.79 \quad (1.1)$$

$$(P10 \cdot \cos 54.35°) \times 10.00 = k\theta 1 \quad (1.2)$$

From expressions (1.1) and (1.2), $F=0.292k\theta 1$ is obtained. Here, suppose $k=1[gf/deg](=980[dyn/deg])$, $\theta 1=10°$. Then, $F=2.92[gf](=2860[dyn])$ is obtained.

FIG. 25 is a plane view of charge mechanism in a first half charging state after charging has further advanced from the state in FIG. 24. The rotation angle of the lever member (driving member) 401 is 14° and the rotation angle of the driven member is 10° after charging is started.

In the same figure, components have dimensions as shown in the figure and the rotation moment that the power spring 405 gives to the driven member 403 is k(θ1+10°). Reference character F denotes a force that the input pin 401b of the lever member 401 receives from the output pin 406c of the charge input lever 406 to balance with k(θ1+10°), P20 denotes a force that the roller 404 receives from the output side arm portion 401c of the lever member 401, which is equal to the reaction force by the force of the power spring 405 that the output side arm portion 401c of the lever member 401 receives through the roller 404.

The following expressions are obtained from the relationship of balance between forces. Here, for simplicity of explanation, frictions of various components are ignored.

$$(F\cdot\cos 15.16°)\times 3.90 = P20\times 4.98 \quad (1.3)$$

$$(P20\cdot\cos 30.35°)\times 10.00 = k(\theta 1+10°) \quad (1.4)$$

From Expressions (1.3) and (1.4), F=0.153k(θ1+10°) is obtained.

Here, suppose k=1[gf/deg](=980[dyn/deg]), θ1=10°. Then, F=3.07[gf](=3000[dyn]) is obtained.

FIG. 26 is a plane view of charge mechanism in an intermediate charging state after charging has further advanced from the state in FIG. 25. The rotation angle of the lever member (driving member) 401 is 30.2° and the rotation angle of the driven member 403 is 18.5° after charging is started.

In the same figure, components have dimensions as shown in the figure. In the intermediate state of charging, the rotation moment that the power spring 405 gives to the driven member 403 is k(θ1+18.5°). Reference character F denotes a force that the input pin 401b of the lever member 401 receives from the output pin 406c of the charge input lever 406 to balance with k(θ1+18.5°), P30 denotes a force that the roller 404 receives from the output side arm portion 401c of the lever member 401, which is equal to the reaction force by the force of the power spring 405 that the output side arm portion 401c of the lever member 401 receives through the roller 404.

The following expressions are obtained from the relationship of balance between forces. Here, for simplicity of explanation, frictions of various components are ignored.

$$(F\cdot\cos 1.04°)\times 3.90 = P30\times 4.94 \quad (1.5)$$

$$(P30\cdot\cos 5.65°)\times 10.00 k(\theta 1+18.5°) \quad (1.6)$$

From expressions (1.5) and (1.6), F=0.127k(θ1+18.5°) is obtained.

Here, suppose k=1[gf/deg](=980[dyn/deg]) and θ1=10°. Then, F=3.63[gf](=3560[dyn]) is obtained.

FIG. 27 is a plane view of charge mechanism in a second half charging state after charging has further advanced from the state in FIG. 26. The rotation angle of the lever member (driving member) 401 is 55.5° and the rotation angle of the driven member is 33° after charging is started.

In the same figure, components have dimensions as shown in the figure. In the second half charging state, the rotation moment that the power spring 405 gives to the driven member 403 is k(θ1+33°). Reference character F denotes a force that the input pin 401b of the lever members 401 receives from the output pin 406c of the charge input lever 406 to balance with k(θ1+33°), P40 denotes a force that the roller 404 receives from the output side arm portion 401c of the lever member 401, which is equal to the reaction force by the force of the power spring 405 that the output side arm portion 401c of the lever member 401 receives through the roller 404.

The following expressions are obtained from the relationship of balance between forces. Here, for simplicity of explanation, frictions of various components are ignored.

$$(F\cdot\cos 26.34°)\times 3.90 = P40\times 6.25 \quad (1.7)$$

$$(P40\cdot\cos 34.15°)\times 10.00 = k(\theta 1+33°) \quad (1.8)$$

From expressions (1.7) and (1.8), F=0.216k(θ1+33°) is obtained.

Here, suppose k=1[gf/deg](=980[dyn/deg]) and θ1=10°. Then, F=9.29[gf](=9110[dyn]) is obtained.

FIG. 28 is a plane view of charge mechanism in a charging completion state after charging has further advanced from the state in FIG. 27. The rotation angle of the lever member (driving member) 401 is 66.5° and the rotation angle of the driven member is 44° after charging is started.

In the same figure, components have dimensions as shown in the figure. In the charging completion state, the rotation moment that the power spring 405 gives to the driven member 403 is k(θ1+44°). Reference character F denotes a force that the input pin 401b of the lever member 401 receives from the output pin 406c of the charge input lever 406 to balance with k(θ1+44°), P50 denotes a force that the roller 404 receives from the output side arm portion 401c of the lever member 401, which is equal to the reaction force by the force of the power spring 405 that the output side arm portion 401c of the lever member 401 receives through the roller 404.

The following expressions are obtained from the relationship of balance between forces. Here, for simplicity of explanation, frictions of various components are ignored.

$$(F\cdot\cos 37.34°)\times 3.90 = P50\times 7.90 \quad (1.9)$$

$$(P50\cdot\cos 56.15°)\times 10.00 = k(\theta 1+44°) \quad (1.10)$$

From expressions (1.9) and (1.10), F=0.457k(θ1+44°) is obtained.

Here, suppose k=1[gf/deg](=980[dyn/deg]) and θ1=10°. Then, F=24.7[gf](=24200([dyn]) is obtained.

Based on the above described results, the graphs shown in FIGS. 7A and 7B give a summary of the relationship between the rotation angle of the driven member and input load of the lever member (which will be described later).

Here, suppose a shutter apparatus provided with the above described charge mechanism (e.g., see Japanese Patent Publication No. S62(1987)-17737 (pp2–5, FIG. 2) and Japanese Utility Model Application Laid-Open No. H4(1992)-17930 (pp2–3, FIG. 1)).

FIG. 30 to FIG. 36 show a conventional charge mechanism of a focal plane shutter (hereinafter simply referred to as a "shutter apparatus") mounted on a single-lens reflex camera. The focal-plane shutter has a front curtain and a rear curtain. FIG. 30 is a perspective view indicating main components of the shutter apparatus, FIG. 31 is a plane view of the shutter apparatus showing a state after completion of running until charging is started, FIG. 32 is a plane view of the shutter apparatus in a first half charging state, FIG. 33 is a plane view of the shutter apparatus in an intermediate state of charging (switching of charge lever axes), FIG. 34 is a plane view of the shutter apparatus showing a second half charging state, FIG. 35 is a plane view of the shutter apparatus in a state immediately before completion of charging and FIG. 36 is a plane view of the shutter apparatus in a state of overcharge. In these FIGS. 31 to 36, suppose straight lines H5, H6 and H7 are common straight lines.

In FIGS. 30 to 36, reference numeral 501 denotes a charge lever (lever member) which is supported to an axial portion 502a laid on a shutter base plate 502 in a rotatable manner and pressed in the thrust direction of the axial portion 502a by a dropout prevention member (not shown) with a tiny gap. Reference numeral 501a denotes an input side arm portion of the charge lever 501, 501b denotes an input pin (input portion) laid in an integrated fashion on the input side arm portion 501a, 501$c_1$ denotes a front curtain side output arm portion of the charge lever 501, 501$c_2$ denotes a rear curtain side output arm portion of the charge lever 501.

Reference numeral 503 denotes a front curtain driving lever (driven member) which is supported to an axial portion 512a laid on the shutter base plate 502 in a rotatable manner and pressed in the thrust direction of the axial portion 512a by a dropout prevention member (not shown) with a tiny gap. At the end of the one arm portion 503c of the front curtain driving lever 503, an axial portion 503a is laid in an integrated fashion and a roller 504 is supported to the axial portion 503a in a rotatable manner. This shutter base plate 502 acts as a dropout prevention member of the roller 504.

At the end of the other arm portion 503d of the front curtain driving lever 503, a front curtain driving pin 503e is laid in an integrated fashion. On the front curtain driving lever (driven member) 503, a power spring (torsion spring) 505 is located in such a way as to be coaxial to the axial portion 512a.

One end of the power spring 505 is supported to a shutter speed adjustment member (not shown) and the other end is hooked on to a spring stopper (not shown) of the front curtain driving lever 503. Hereby, the power spring 505 gives the front curtain driving lever 503 clockwise torque about the axial portion 512a as the rotation axis. A front curtain main arm 516 is supported to an axial portion 502g laid on the shutter base plate 502 in a rotatable manner. Furthermore, a front curtain sub-arm 517 is supported to an axial portion 502h laid on the shutter base plate 502 in a rotatable manner. Then, a slit formation blade (first blade) 518a of a blade group 518 making up the front curtain has a slit formation portion 518e.

Of the blade group 518, a second blade 518b, a third blade 518c and a fourth blade 518d are supported to the front curtain main arm 516 and front curtain sub-arm 517 in a rotatable manner using a caulking dowel 519a, etc., and both arms 516, 517 and each blade together forms a parallel link (publicly known configuration). Furthermore, an armature holding portion 503f is formed above the arm portion 503d of the front curtain driving lever 503 to hold a magnet armature 523 by means of an armature axis 524 with a certain degree of freedom. Then, a yoke 525 wound with a coil 526 is fixed to a base plate (not shown), which attracts and holds the armature 523 when power is supplied to the coil 526, and releases the armature 523 when the power supply to the coil 526 is interrupted. Shutter timing is controlled using the above described operation.

Reference numeral 513 denotes a rear curtain driving lever (driven member), which is supported to an axial portion 512b laid on the shutter base plate 502 in a rotatable manner and pressed in the thrust direction of the axial portion 512b by a dropout prevention member (not shown) with a tiny gap. At one end of the arm portion 513c of the rear curtain driving lever 513, an axial portion 513a is laid in an integrated fashion and a roller 514 is supported to the axial portion 513a in a rotatable manner.

The shutter base plate 502 acts as a dropout prevention member for the roller 514. At one end of the arm portion 513d of the rear curtain driving lever 513, a rear curtain driving pin 513e is laid in an integrated fashion. On the rear curtain driving lever (driven member) 513, a power spring (torsion spring) 515 is located in such a way as to be coaxial with the axial portion 512b. One end of the power spring 515 is supported to a shutter speed adjustment member (not shown) and the other end is hooked on to a spring stopper (not shown) of the rear curtain driving lever 513. Hereby the power spring 513 gives the rear curtain driving lever 513 clockwise torque about the axial portion 512b as the rotation axis. The rear curtain main arm 520 is supported to an axial portion 502i laid on the shutter base plate 502 in a rotatable manner. Furthermore, a rear curtain sub-arm 521 is supported to an axial portion 502j laid on the shutter base plate 502 in a rotatable manner.

Furthermore, a blade group 522 making up the rear curtain is constructed of four blades as in the case of the front curtain. Reference numeral 522e in FIGS. 32 to 35 denotes a slit formation portion in the blade group 522. Each blade of the blade group 522 is supported to the rear curtain main arm 520 and the rear curtain sub-arm 521 in a rotatable manner using a caulking dowel 519b, etc., and both arms 520, 521 and each blade together forms a parallel link (publicly known configuration). Furthermore, an armature holding portion 513f is formed above the arm portion 513c of the rear curtain driving lever 513 and the armature holding portion 513f holds a magnet armature 527 by means of an armature axis 528 with a certain degree of freedom of movement.

A yoke 529 wounded with a coil 530 is fixed to a base plate (not shown), which attracts and holds the armature 527 when power is supplied to the coil 530, and releases the armature 527 when the power supply to the coil 530 is interrupted. Shutter timing is controlled using the above described operation. Reference numeral 502d denotes an aperture formed on the shutter base plate 502 through which a light passes and 502e denotes a long hole portion which is formed on the shutter base plate along a movement track of the front curtain driving pin 503e and 502f denotes a long hole portion which is formed on the shutter base plate along a movement track of the rear curtain driving pin 513e. Reference numerals 511a and 511b denote buffering members for receiving the front curtain driving pin 503e and rear curtain driving pin 513e when running of the front curtain is completed.

The charge mechanism of the conventional shutter apparatus as described above sets a maximum width from the input pin 501b laid in an integrated fashion on the input side arm portion 501a to the left end of the shutter apparatus to 12.6 mm (see FIG. 33) and sets the stroke of the input pin 501b (distance between straight line H5 and straight line H6) to 4.25 mm.

Furthermore, a charge input lever (not shown) which contacts the input pin 501b of the charge lever 501 to give the charge lever 501 torque in the same relationship as reference numeral 406 in FIG. 23 is provided.

The above described charge mechanism in which the lever member 401 simply rotates around one rotation axis involves inconvenience that when charging is started and when charging is completed, an angle formed between the straight line (L in FIGS. 24 to 29) connecting the central axis of the input pin 401b of the lever member 401 and the center of the axial portion 402a, and the line (H in FIGS. 24 to 29) orthogonal to the direction of the force F increases and the component force in the direction of the rotation axis 402a of the lever member 401 of the force that the input pin 401b receives from the output pin 406c of the charge input lever 406 is large (that is, axial loss is large), causing the force that rotates the lever member in the charge direction (clockwise direction) to be lost.

SUMMARY OF THE INVENTION

It is an object of the present invention to provide a small driving apparatus with a low charging load. The present invention is especially designed to reduce axial loss by reducing the component force in the axial direction during charging, reduce displacement at the input end in the direction orthogonal to the direction of the input load and thereby increase the driving efficiency.

One aspect of the driving apparatus of the present invention includes the following: A driving source, a driven member, an energizing member which energizes the driven member in a predetermined direction, a lever member rotatable by receiving the driving force from the driving source at an input portion, which contacts and charges the driven member, and a main body which includes a first engaging portion and a second engaging portion and supports the lever member. Here, the lever member includes a first engaged portion which engages with the first engaging portion and a second engaged portion which engages with the second engaging portion, and the lever member is rotated around a first axis by engaging the first engaging portion and the first engaged portion with each other, and in the middle of rotation, the lever member is rotated around a second axis by engaging the second engaging portion and the second engaged portion with each other.

One aspect of the shutter apparatus of the present invention includes the following: A driving source, a front curtain constructed of a plurality of blades, a rear curtain constructed of a plurality of blades, a first driving lever which drives charging of the front curtain, a second driving lever which drives charging of the rear curtain; and a driving force transmission member rotatable by receiving the driving force from the driving source, which includes a first arm portion which contacts the first driving lever and transmit the driving force and a second arm portion which contacts the second driving lever and transmits driving force. Here, the driving force transmission member starts charging when the distance between the rotation center and the point of contact with the first driving lever is greater than the distance between the rotation center and the point of contact with the second driving lever and is set through switching of the rotation center at some midpoint so that the distance between the rotation center and the point of contact with the second driving lever is greater than the distance between the rotation center and the point of contact with the first driving lever.

One aspect of the camera of the present invention includes the above described shutter apparatus.

Features of the driving apparatus, shutter apparatus and camera of the present invention will become more apparent from the following detailed description of preferred embodiments of the invention with reference to the drawings.

DETAILED DESCRIPTION OF THE PREFERRED EMBODIMENTS (First Embodiment)

A charge mechanism according to this embodiment will be explained.

Figure 1:
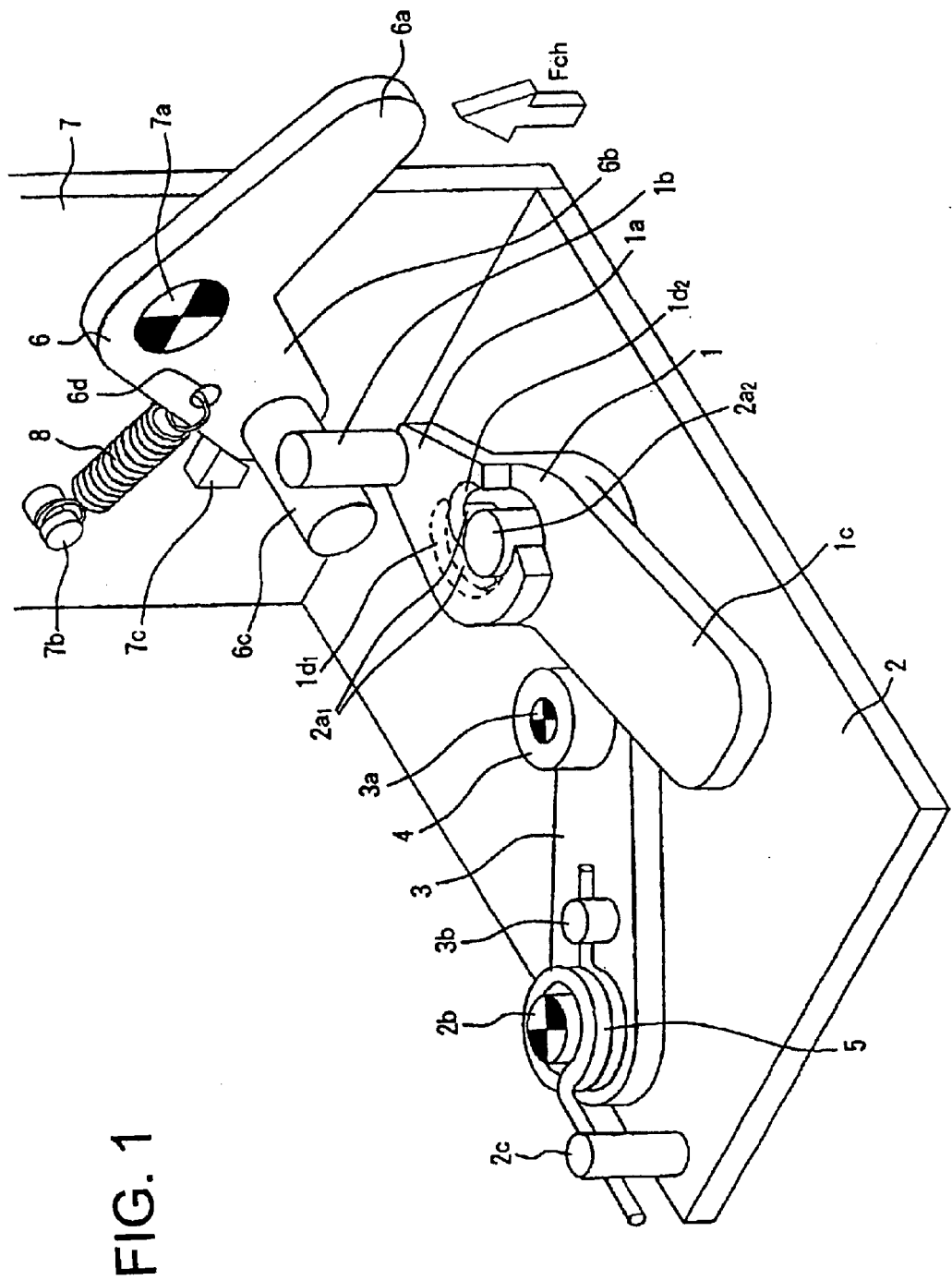
FIG. 1 is a perspective view of an entire charge mechanism which is a first embodiment of the present invention.
Figure 2:
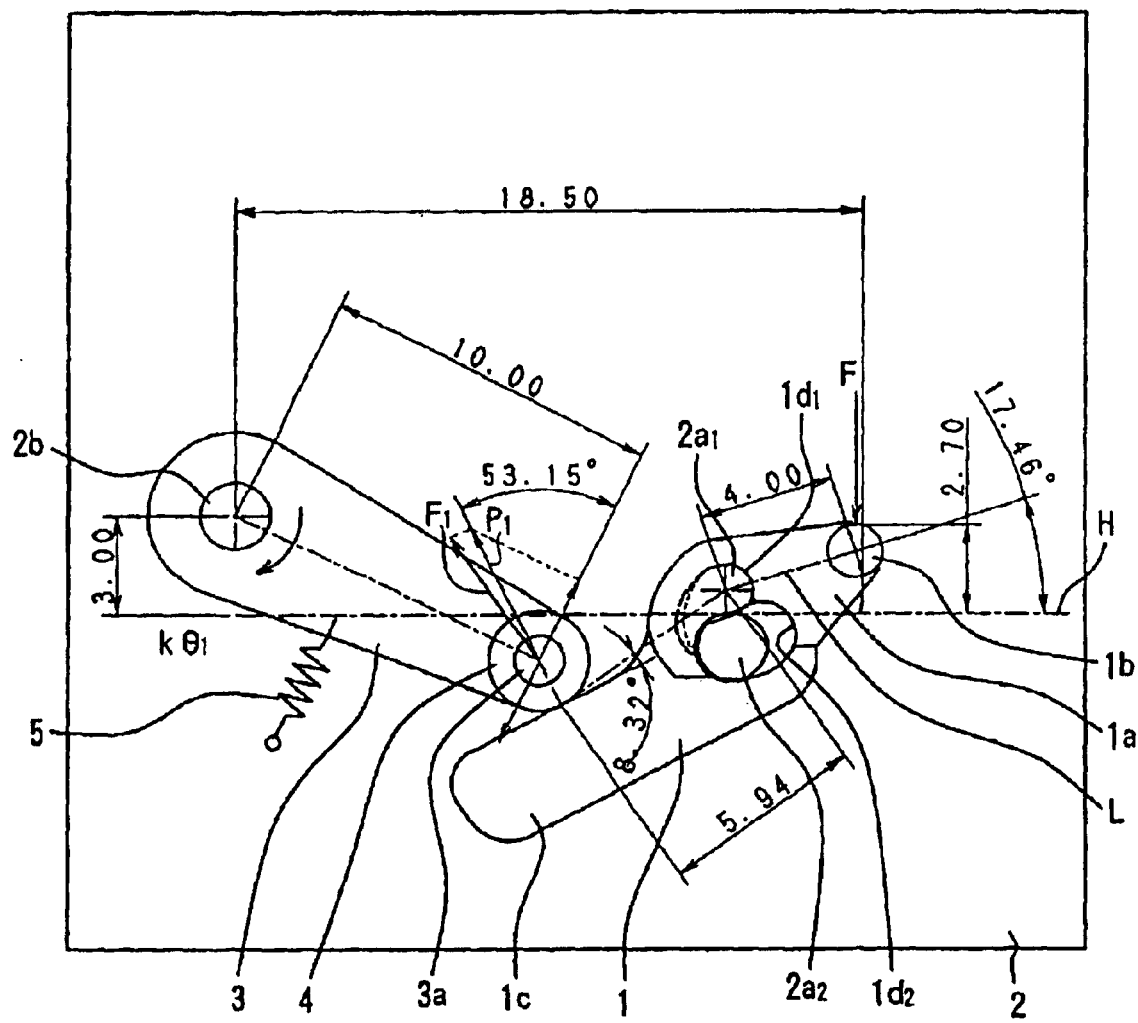
FIG. 2 is a plane view of the charge mechanism in a charging start state according to the first embodiment of the present invention.
Figure 3:
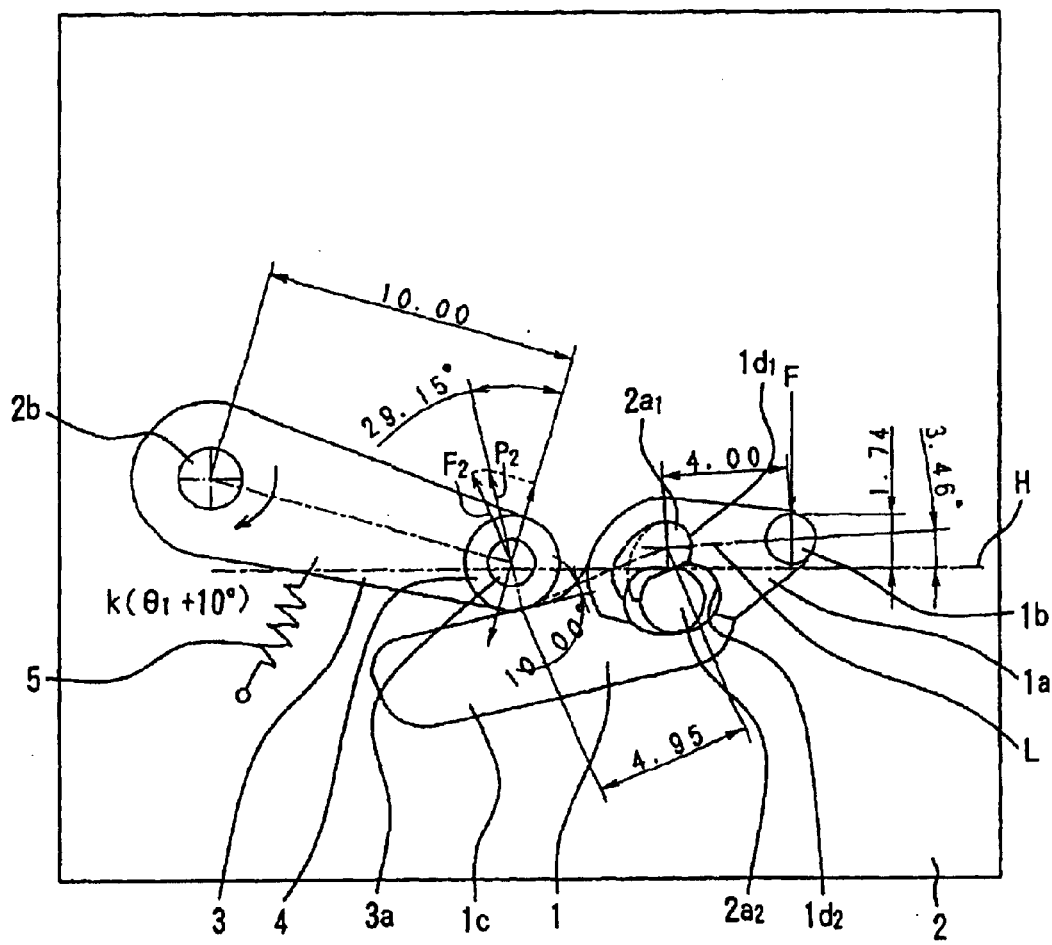
FIG. 3 is a plane view of the charge mechanism in a first half charging state according to the first embodiment of the present invention.
Figure 4:
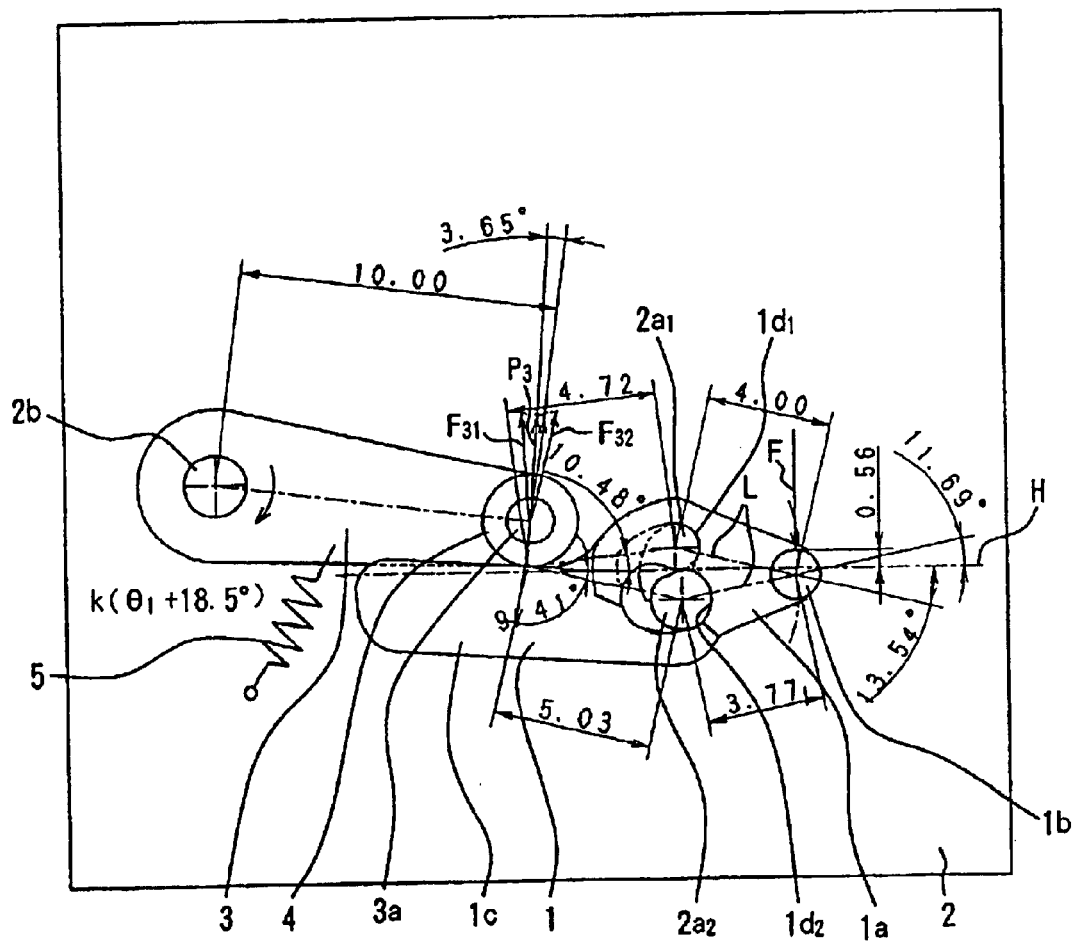
FIG. 4 is a plane view of the charge mechanism in an intermediate charging (axis switching) state according to the first embodiment of the present invention.
Figure 5:
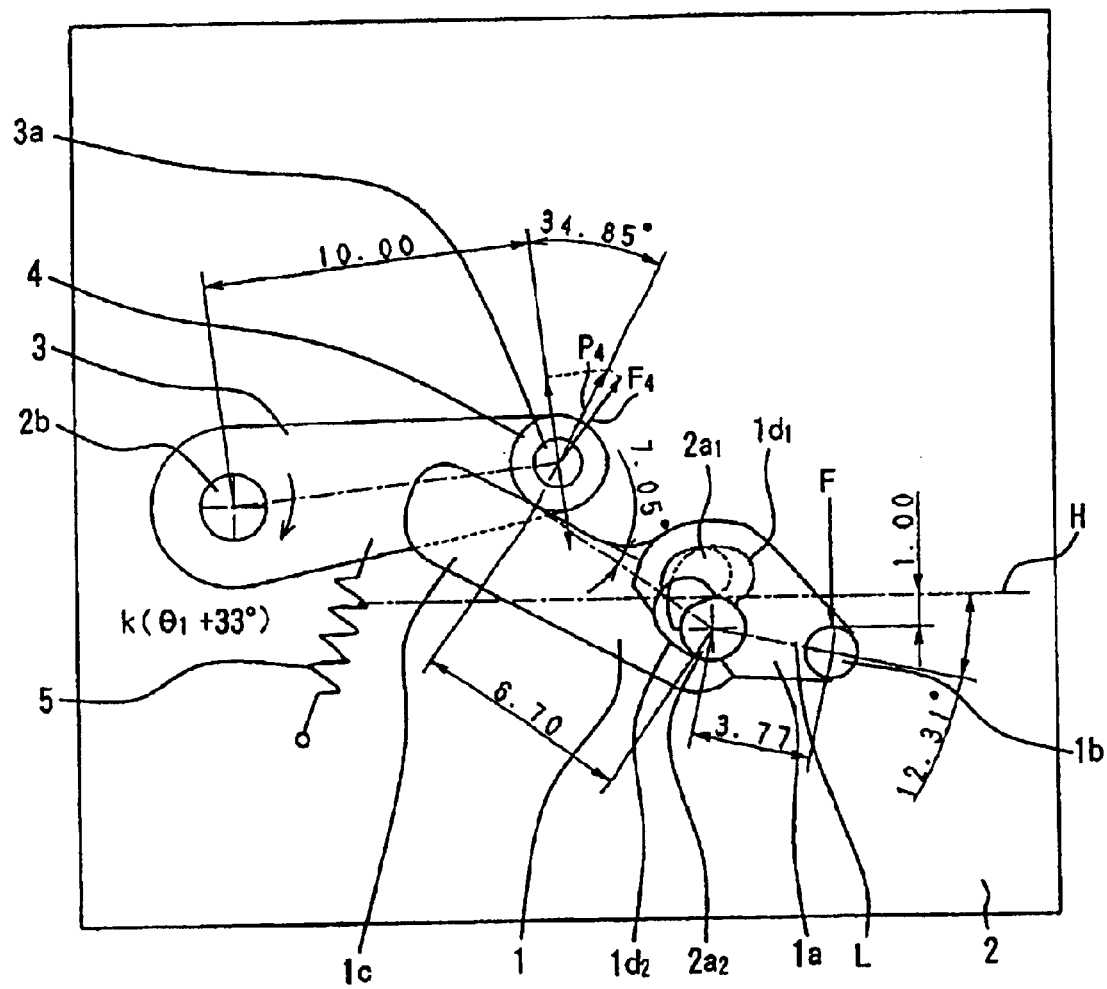
FIG. 5 is a plane view of the charge mechanism in a second half charging state according to the first embodiment of the present invention.
Figure 6:
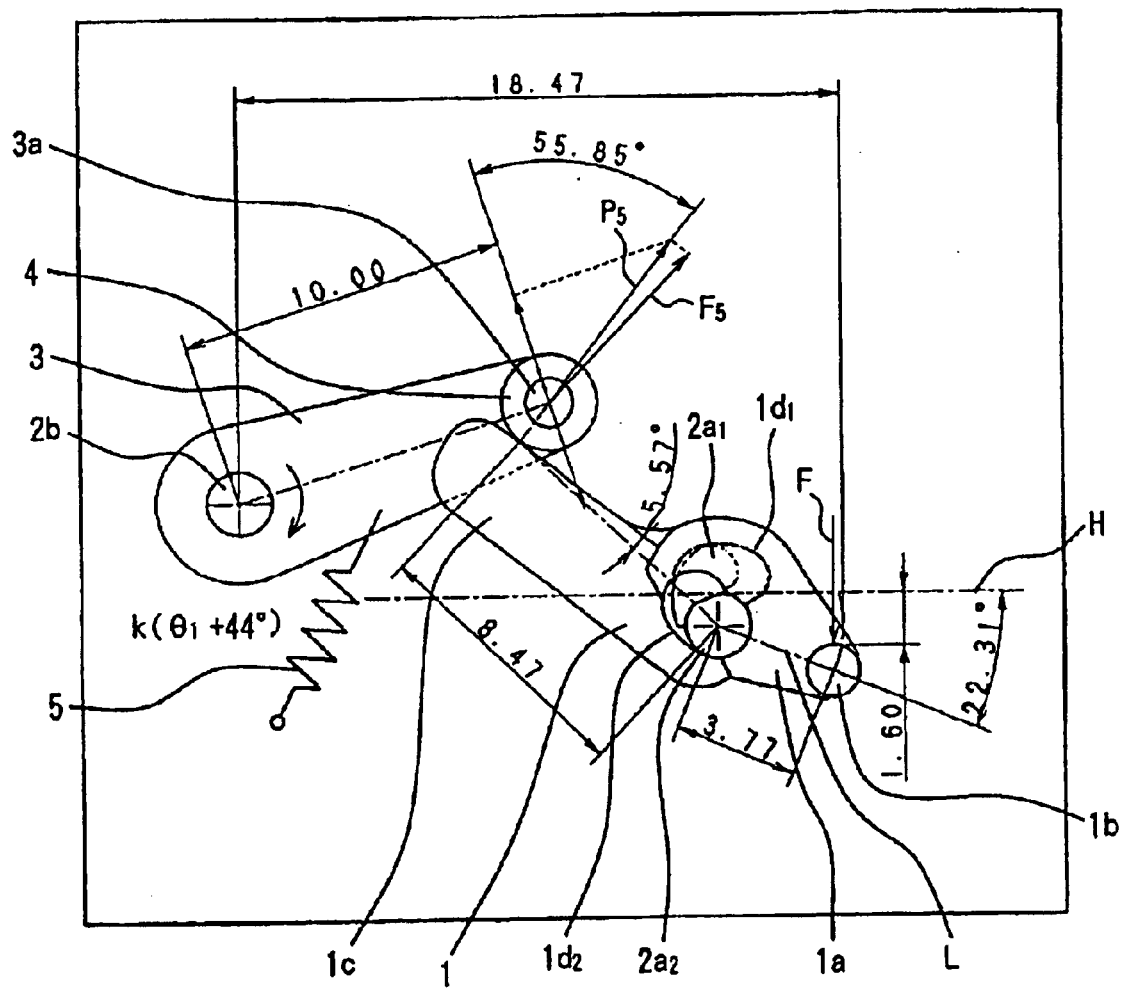
FIG. 6 is a plane view of the charge mechanism in a charging completion state according to the first embodiment of the present invention.

FIGS. 1 to 8 illustrate the charge mechanism according to the first embodiment of the present invention. FIG. 1 is a perspective view of the entire charge mechanism, FIG. 2 is a plane view of the charge mechanism which a lever member 1 and driven member 3 are placed on the first base plate 2 in a charging start state, FIG. 3 is a plane view of the charge mechanism in a first half charging state, FIG. 4 is a plane view of the charge mechanism in an intermediate charging (axis switching) state, FIG. 5 is a plane view of the charge mechanism in a second half charging state and FIG. 6 is a plane view of the charge mechanism in a charging completion state.

Figures 7A, 7B:
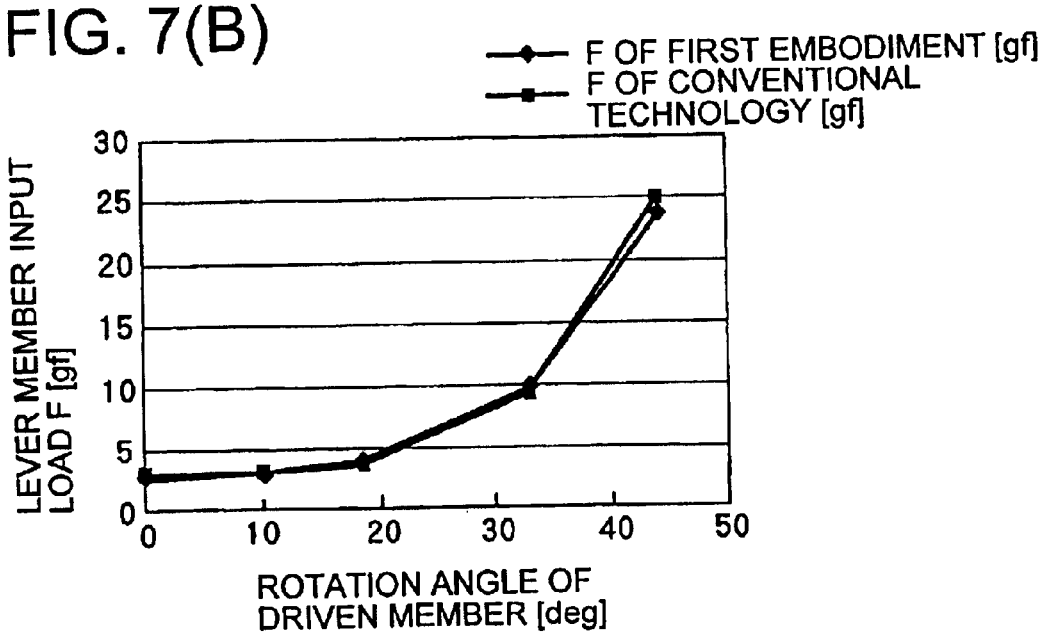
FIGS. 7(A) and 7(B) illustrate a relationship between the rotation angle of a driven member and an input load of the lever member.
Figure 8:
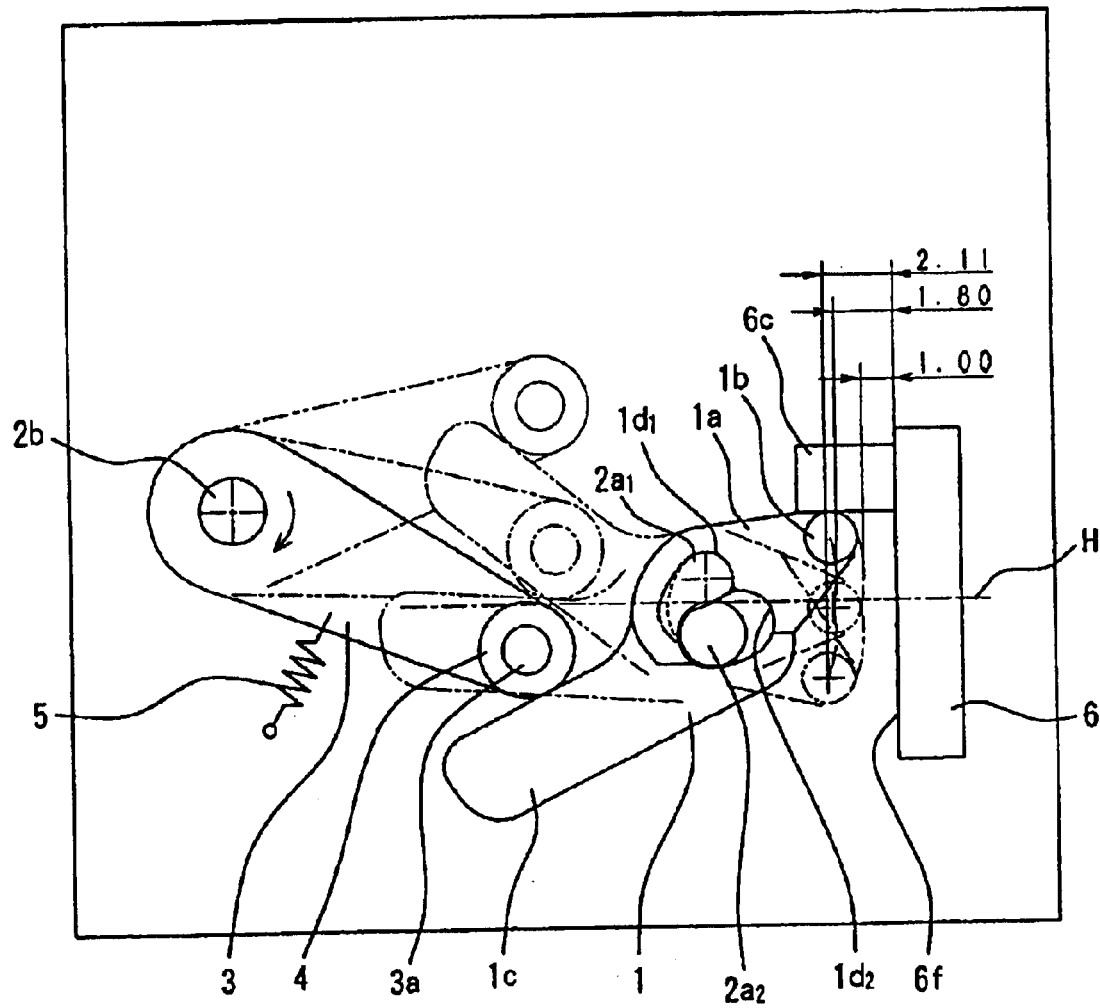
FIG. 8 is a plane view of the charge mechanism in illustrating a relationship between a charge input member and lever member according to the first embodiment of the present invention.

FIG. 7 illustrates a relationship between the rotation angle of a driven member and an input load of the lever member, FIG. 7A is a table and FIG. 7B is a graph. FIG. 8 is a plane view of the charge mechanism illustrating a relationship between a charge input member and lever member.

In FIG. 1, reference numeral 1 denotes a lever member, which is supported in a manner rotatable about a first axial portion (a first engaging portion) 2a1 and a second axial portion (a second engaging portion) 2a2 laid on a first base plate 2 as rotation axes and pressed in the thrust directions of the first axial portion 2a1 and second axial portion 2a2 by a dropout prevention member (not shown) with a tiny gap. Reference numeral 1a denotes an input side arm portion of the lever member 1, 1b denotes an input pin (input portion) laid on the input side arm portion 1a in an integrated fashion and 1c denotes an output side arm portion of the lever member 1.

Reference numeral 1d1 denotes a first bearing portion (a first engaged portion) which engages with the first axial portion 2a1 and makes the lever member 1 rotatable about the first axial portion 2a1 as the rotation axis (first rotation axis) and 1d2 denotes a second bearing portion (a second engaged portion) which engages with the second axial portion 2a2 and makes the lever member 1 rotatable about the second axial portion 2a2 as the rotation axis (second rotation axis).

The first bearing portion 1d1 is hidden in the perspective view of FIG. 1, but formed inside (side facing the first base plate 2) the lever member 1 as shown with the dotted lines and formed in a position different from the second bearing portion 1d2 which penetrates the lever member 1.

That is, the position of engagement between the first axial portion 2a1 and first bearing portion 1d1 and position of engagement between the second axial portion 2a2 and second bearing portion 1d2 are set to be different in the thickness direction of the lever member 1. This allows the rotation center of the lever member 1 to be switched smoothly with a smaller space.

Reference numeral 3 denotes a driven member which is supported in a manner rotatable about an axial portion 2b laid on the first base plate 2 as the rotation axis and pressed in the thrust direction of the axial portion 2b by a dropout prevention member (not shown) with a tiny gap. At one end of the driven member 3, the axial portion 3a is laid in an integrated fashion and a roller 4 is attached to the axial portion 3a in a rotatable manner. A dropout prevention member (not shown) acts on the roller 4 in the same way.

Reference numeral 5 denotes a torsion spring (power spring) provided on the driven member 3 in such a way as to be coaxial with the axial portion 2b and its one end contacts a spring stopper 2c laid on the first base plate 2 and its other end contacts a spring stopper 3b of the driven member 3. The power spring 5 placed in this way gives the driven member 3 clockwise torque about the axial portion 2b as the rotation axis.

Reference numeral 6 denotes a charge input lever (transmission member) and is supported in a manner rotatable about an axial portion 7a laid on a second base plate 7 (placed orthogonal to the first base plate 2) as the rotation axis and pressed in the thrust direction of the axial portion 7a by a dropout prevention member (not shown) with a tiny gap. Reference numeral 6a denotes an input side arm portion of the charge input lever 6, which receives a force Fch transmitted from a driving source (not shown) and rotates the charge input lever 6 counterclockwise about the axial portion 7a as the rotation axis.

Reference numeral 6b denotes an output side arm portion of the charge input lever 6. 6c denotes an output pin laid on the output side arm portion 6b in an integrated fashion, which contacts the input pin 1b of the lever member 1 and transmits power to the lever member 1.

Reference numeral 8 denotes a return spring, one end of which is supported by a spring stopper 7b laid on the second base plate 7 and the other end of which is hooked on to a hole 6d of the charge input lever 6. This causes the return spring 8 to give the charge input lever 6 clockwise torque about the axial portion 7a as the rotation axis. Reference numeral 7c denotes a stopper provided on the second base plate 7 which contacts the side of the output side arm portion 6b of the charge input lever 6 and blocks the clockwise rotation of the charge input lever 6 by the return spring 8 (see FIG. 1).

The distance between the center of the first axial portion 2a1 and the center of the input pin 1b is 4.00 mm and the distance between the center of the second axial portion 2a2 and the center of the input pin 1b is 3.77 mm, that is, these distances are set to substantially the same length. This can suppress drastic variations of load when the rotation center of the lever member 1 is switched from the first axial portion 2a1 to the second axial portion 2a2 in the middle of rotation of the lever member 1.

Furthermore, to reduce (that is, reduce axial loss) the component force in the direction of the first and second rotation axis of the lever member 1 of the driving force transmitted from the output pin 6c of the charge input lever 6 to the input pin 1b, the total rotation angle (sum of rotation angles) of the lever member 1 about the first axial portion 2a1 and second axial portion 2a2 as the rotation axes is set to 65° (31°+34°).

That is, the total rotation angle is set to be greater than 39.77° which is the sum of angle 17.46° formed by the straight line (L) connecting the center of the first axial portion 2a1 and the center of the input pin 1b when charging is started (see FIG. 2) and the straight line (H) orthogonal to the direction of the force applied to the input pin 1b, and angle 22.31° formed by the straight line (L) connecting the center of the second axial portion 2a2 and the center of the input pin 1b when charging is completed (see FIG. 6) and the straight line (H) orthogonal to the direction of the force applied to the input pin 1b.

Then, the operation of the charge mechanism in such a configuration will be explained in detail below.

First, when a driving force Fch is applied to the input side arm portion 6a of the charge input lever 6, the charge input lever 6 rotates counterclockwise in FIG. 1 about the axial portion 7a as the rotation axis. This causes the output pin 6c on the output side arm portion 6b to push in the input pin 1b on the input side arm portion 1a, causes the first bearing portion 1d1 to contact the first axial portion 2a1, making the lever member 1 rotate clockwise about the first axial portion 2a1 as the rotation axis. This causes the output side arm portion 1c of the lever member 1 to push the roller 4 and makes the driven member 3 rotate counterclockwise about the axial portion 2b as the rotation axis against the force of the power spring 5.

Here, if the second bearing portion 1d2 contacts the second axial portion 2a2 in the middle of rotation of the lever member 1, the first bearing portion 1d1 disengages from the first axial portion 2a1 and the lever member 1 rotates clockwise about the second axial portion 2a2 as the rotation axis (that is, by switching the rotation center from the first axial portion to the second axial portion). Then, charging is finished when the lever member 1 has rotated a predetermined angle.

On the other hand, when the force Fch is no longer applied in a charging completion state, the lever member 1 goes the opposite way of the charging process by the force of the power spring 5 and returns to the charging start state.

The operation of the charge mechanism according to this embodiment will be explained sequentially in detail with the state of charging load in the middle of the operation taken into consideration. The power spring 5 is a torsion spring, but will be expressed as a tensile coil spring in the figures (FIGS. 2 to 6) used in the following explanations.

FIG. 2 is a plane view of the charge lever member 1 and the driven member 3 placed on the first base plate 2 in the charge starting state (the charge input lever 6, etc., placed on the second base plate 7 is omitted) and shows the case where both the rotation angle of the lever member and the rotation angle of the driven member are 0°.

In FIG. 2, components have dimensions as indicated in the figure and suppose the rotation moment that the power spring 5 gives to the driven member 3 is $k\theta 1$ when charging is started. Here, k denotes a spring constant of the power spring 5 per unit rotation angle when the driven member 3 rotates. Furthermore, $\theta 1$ denotes an angle by which the power spring 5 has displaced from a free state rotating about the axial portion 2b.

Reference character F indicated by the arrow in FIG. 2 denotes a force (that is, the driving force transmitted from the driving source) that the input pin 1b of the lever member 1 receives from the output pin 6c of the charge input lever 6 to balance with $k\theta 1$, P1 indicated by the arrow denotes the force that the roller 4 receives from the output side arm portion 1c of the lever member 1, which is equal to a reaction force by the force of the power spring 5 that the output side arm portion 1c of the lever member 1 receives through the roller 4. F1 indicated by the arrow is a force component around the first axial portion 2a1 to generate P1.

From the relationship of balance between forces, the following expressions are obtained. Here, for simplicity of explanation, frictions of various portions are ignored.

$$(F \cdot \cos 17.46°) \times 4.00 = F1 \times 5.94 \quad (2.1)$$

$$F1 \cdot \cos 8.32° = P1 \quad (2.2)$$

$$(P1 \cdot \cos 53.15°) \times 10.00 = k\theta 1 \quad (2.3)$$

From expressions (2.1), (2.2) and (2.3), $F=0.262k\theta 1$ is obtained.

Here, suppose $k=1[\text{gf/deg}](=980[\text{dyn/deg}])$ and $\theta 1=10°$. Then, $F=2.62[\text{gf}](=2570[\text{dyn}])$ is obtained.

FIG. 3 is a plane view of the charge mechanism in a first half charging state after charging has advanced from the state in FIG. 2. Here, the first half charging state means the range after charging is started until the rotation center of the lever member 1 is switched from the first axial portion to the second axial portion. The rotation angle of the lever member 1 after charging is started is 14° and the rotation angle of the driven member 3 is 10° in the state shown in FIG. 3.

In the same figure, components have dimensions as shown in the figure and the rotation moment that the power spring 5 gives to the driven member 3 is $k(\theta 1+10°)$. Reference character F indicated by the arrow in the figure denotes a force that the input pin 1b of the lever member 1 receives from the output pin 6c of the charge input lever 6 to balance with $k(\theta 1+10°)$, P2 indicated by the arrow denotes a force that the roller 4 receives from the output side arm portion 1c of the lever member 1, which is equal to the reaction force by the force of the power spring 5 that the output side arm portion 1c of the lever member 1 receives through the roller 4. F2 indicated by the arrow denotes a force component around the first axial portion 2a1 to generate P2.

The following expressions are obtained from the relationship of balance between forces. Here, for simplicity of explanation, frictions of various components are ignored.

$$(F \cdot \cos 3.46°) \times 4.00 = F2 \times 4.95 \quad (2.4)$$

$$F2 \cdot \cos 10.00° = P2 \quad (2.5)$$

$$(P2 \cdot \cos 29.15°) \times 10.00 = k(\theta 1+10°) \quad (2.6)$$

From expressions (2.4), (2.5) and (2.6), $F=0.144k(\theta 1+10°)$ is obtained.

Here, suppose $k=1[\text{gf/deg}](=980[\text{dyn/deg}])$ and $\theta 1=10°$. Then, $F=2.88[\text{gf}](=2820[\text{dyn}])$ is obtained.

FIG. 4 is a plane view of the charge mechanism in an intermediate charging (range in which the rotation center of the lever member 1 is switched from the first axial portion to the second axial portion) state after charging has advanced from the state in FIG. 3. The rotation angle of the lever member 1 after charging is started is 31° and the rotation angle of the driven member is 18.5° in the state shown in FIG. 4.

In the same figure, components have dimensions as shown in the figure and the rotation moment that the power spring 5 gives to the driven member 3 is $k(\theta 1+18.5°)$. Reference character F indicated by the arrow in the figure denotes a force that the input pin 1b of the lever member 1 receives from the output pin 6c of the charge input lever 6 to balance with $k(\theta 1+18.5°)$, P3 indicated by the arrow denotes a force that the roller 4 receives from the output side arm portion 1c of the lever member 1, which is equal to the reaction force by the force of the power spring 5 that the output side arm portion 1$c$ of the lever member 1 receives through the roller 4. F31 indicated by the arrow denotes a force component around the axial portion 2$a$1 to generate P3 and F32 indicated by the arrow denotes a force component around the axial portion 2$a$2 to generate P3.

From the balance relationship between forces, the following expressions are obtained. Here, for simplicity of explanation, frictions of various portions are ignored.

The following expression are obtained around the axial portion 2$a$1:

$$(F \cdot \cos 13.54°) \times 4.00 = F31 \times 4.72 \quad (2.7)$$

$$F31 \cdot \cos 10.48° = P3 \quad (2.8)$$

$$(P3 \cdot \cos 3.65°) \times 10.00 = k(\theta1 + 18.5°) \quad (2.9)$$

From expressions (2.7), (2.8) and (2.9), F=0.124k($\theta$1+18.5°) is obtained.

Here, suppose k=1[gf/deg](=980[dyn/deg]) and $\theta$1=10°. Then F=3.52[gf](=3450[dyn])

The following expressions are obtained around the axial portion 2$a$2:

$$(F \cdot \cos 11.69°) \times 3.77 = F32 \times 5.03 \quad (2.10)$$

$$F32 \cdot \cos 9.41° = P3 \quad (2.11)$$

$$(P3 \cdot \cos 3.65°) \times 10.00 = k(\theta1 + 18.5°) \quad (2.12)$$

From expressions (2.10), (2.11) and (2.12), F=0.138k($\theta$1+18.5°) is obtained.

Here, suppose k=1[gf/deg](=980[dyn/deg]), $\theta$1=10°. Then, F=3.94[gf](=3860[dyn]) is obtained.

FIG. 5 is a plane view of the charge mechanism in a second half charging (that is, after the rotation center of the lever member 1 is switched from the first axial portion to the second axial portion until the charge operation is completed) state after charging has advanced from the state in FIG. 4. In the state shown in FIG. 5, the rotation angle of the lever member 1 is 31°+24° and the rotation angle of the driven member 3 is 33° after charging is started.

In the same figure, components have dimensions as shown in the figure and the rotation moment that the power spring 5 gives to the driven member 3 is k($\theta$1+33°). Reference character F indicated by the arrow in the figure denotes a force that the input pin 1$b$ of the lever member 1 receives from the output pin 6$c$ of the charge input lever 6 to balance with k($\theta$1+33°), P4 indicated by the arrow denotes a force that the roller 4 receives from the output side arm portion 1$c$ of the lever member 1, which is equal to the reaction force by the force of the power spring 5 that the output side arm portion 1$c$ of the lever member 1 receives through the roller 4. F4 indicated by the arrow is the force component around the axial portion 2$a$2 to generate P4.

From the relationship of balance between forces, the following expressions are obtained. Here, for simplicity of explanation, frictions of various components are ignored.

$$(F \cdot \cos 12.31°) \times 3.77 = F4 \times 6.70 \quad (2.13)$$

$$F4 \cdot \cos 7.05° = P4 \quad (2.14)$$

$$(P4 \cdot \cos 34.85°) \times 10.00 = k(\theta1 + 33°) \quad (2.15)$$

From Expressions (2.13), (2.14) and (2.15), F=0.223k ($\theta$1+33°) is obtained.

Here, suppose k=1[gf/deg](=980[dyn/deg]) and $\theta$1=10°.

Then, F=9.60[gf](=9410[dyn]) is obtained.

FIG. 6 is a plane view of the charge mechanism in a charging completion state after charging has advanced from the state in FIG. 5. The rotation angle of the lever member 1 after charging is started is 31°+34° and the rotation angle of the driven member 3 is 44° in the state shown in FIG. 6.

In the same figure, components have dimensions as shown in the figure and the rotation moment that the power spring 5 gives to the driven member 3 is k($\theta$1+44°). Reference character F indicated by the arrow in the figure denotes a force that the input pin 1$b$ of the lever member 1 receives from the output pin 6$c$ of the charge input lever 6 to balance with k($\theta$1+44°), P5 indicated by the arrow denotes a force that the roller 4 receives from the output side arm portion 1$c$ of the lever member 1, which is equal to the reaction force by the force of the power spring 5 that the output side arm portion 1$c$ of the lever member 1 receives through the roller 4. F5 indicated by the arrow is the force component around the axial portion 2$a$2 to generate P5.

From the relationship of balance between forces, the following expressions are obtained. Here, for simplicity of explanation, frictions of various components are ignored.

$$(F \cdot \cos 22.31°) \times 3.77 = F4 \times 8.47 \quad (2.16)$$

$$F5 \cdot \cos 5.57° = P5 \quad (2.17)$$

$$(P5 \cdot \cos 55.85°) \times 10.00 = k(\theta1 + 44°) \quad (2.18)$$

From Expressions (2.16), (2.17) and (2.18), F=0.435k ($\theta$1+44°) is obtained.

Here, suppose k=1[gf/deg](=980[dyn/deg]) and $\theta$1=10°. Then, F=23.5[gf](=23000[dyn]) is obtained.

FIG. 7 compares the results about the charge mechanism in this embodiment obtained as shown above with the charge mechanism in the above described conventional technology and summarizes the relationship between the rotation angle of the driven member (3, 403) and input load of the lever member (1, 401) as a table (FIG. 7A) and graph (FIG. 7B).

From above, the input load of the charge mechanism in this embodiment increases by a little less than 10% in the middle (near 18.5 to 33 deg) of the rotation angle (charge) of the driven member compared to the charge mechanism in the conventional technology, but it decreases by 3 to 10% in the first half charging state (0 to 18.5 deg), and definitely decreases from the second half charging state (near 40 deg) to the final state (44 deg) and the load peak which is important to the charge mechanism (44 deg at the final part of the rotation angle) decrease by not less than approximately 5%.

Figure 29:
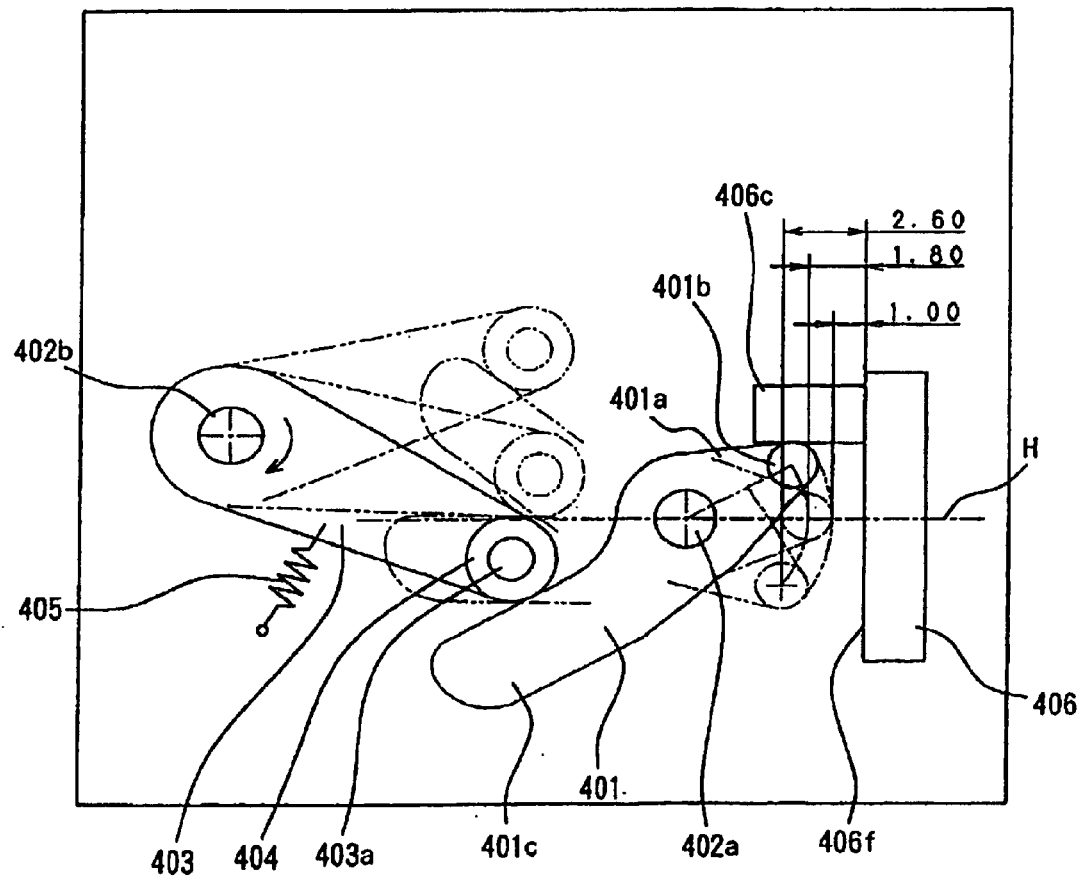
FIG. 29 is a plane view of the conventional charge mechanism illustrating a relationship between the charge input member and lever member.

In addition, in the relationship between the charge input lever (6, 406) and the lever member (1, 401) during charging, the operation positional relationship between the output pin (6$c$, 406$c$) and input pin (1$b$, 401$b$) will be compared in FIG. 8 and FIG. 29. Here, FIG. 8 is a plane view of the charge mechanism in this embodiment showing the positional relationship between the charge input lever 6 and lever member 1. FIG. 29 is a plane view of the conventional charge mechanism showing the positional relationship between the charge input lever 406 and lever member 401.

In these figures, solid lines show the lever member (1,401) and the driven member (3, 403) in the charging start state and two-dot dashed lines show the lever member (1, 401) and driven member (3, 403) in the state at some midpoint of charging and state of completion of charge. For simplicity of explanation and ease of understanding of the figure, only the charging start state of the charge input lever (6, 406) is shown. In the middle of charging or when the charge operation is completed, the output pin (6c, 406c) moves downward while remaining in contact with the input pin (1b, 401b).

Here, assuming that the shortest distance between the lever surface (6f, 406f) of the charge input lever (6, 406) and the input pin (1b, 401b) of the lever member (1, 401) is 1.00 mm, the positional relationship between the output pin (6c, 406c) and input pin (1b, 401b) during charging will be examined.

With the charge mechanism of the conventional technology, the central position of the input pin 401b is farthest from the lever surface 406f of the charge input lever 406 when charging is completed and the distance is 2.60 mm. Since the distance is 1.80 mm at the most proximate position in the middle of charging, the width of movement while the output pin 406c is in contact with the input pin 401b during charging is 0.80 mm.

On the other hand, with the charge mechanism of this embodiment, the central position of the input pin 1b is farthest from the lever surface 6f of the charge input lever 6 when the charge operation is completed and the distance is 2.11 mm (81% of the value of the charge mechanism of the conventional technology). Since the distance is 1.80 mm at the most proximate position during charging, the width of movement while the output pin 6c is in contact with the input pin 1b is 0.31 mm (39% of the charge mechanism of the conventional technology).

Therefore, the charge mechanism according to this embodiment has the merit compared to the conventional technology as follows.

First, since the torsion moment applied to the charge input lever 6 is by far small and the charge input lever 6 is not tilted, axial loss during rotation and friction loss due to contact between the charge input lever 6 and the second base plate 7 during rotation are small and the operation efficiency is high.

Furthermore, loss by friction between the output pin 6c and input pin 1b is small and the operation efficiency is high, which allows the overall charging load in the charge mechanism to be reduced drastically. Furthermore, the width direction is reduced by 2.60 (above described conventional value)–2.11 (value in this embodiment)=0.49 mm, thus contributing to miniaturization.

(Second Embodiment)

Figure 9:
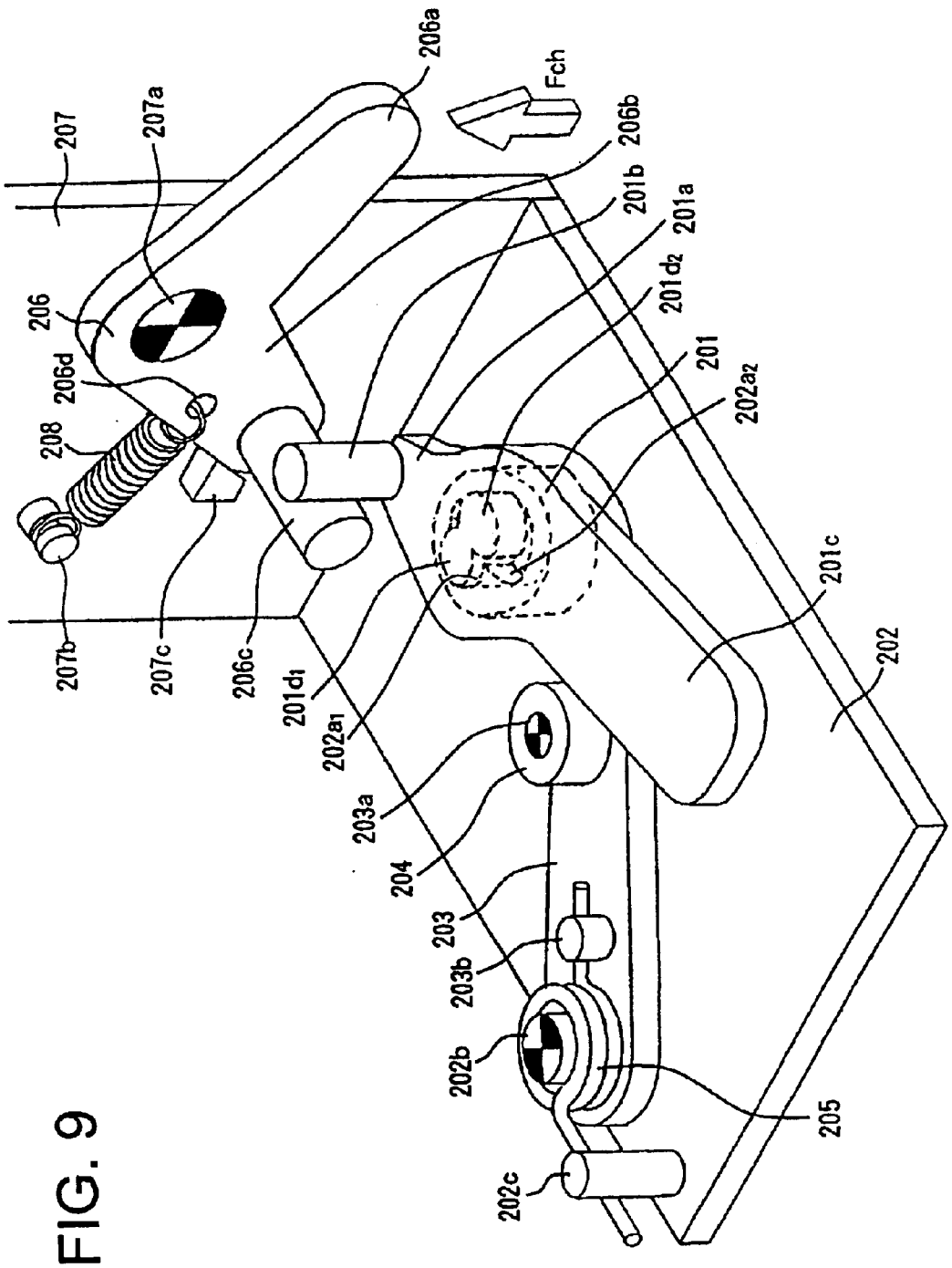
FIG. 9 is a perspective view of an entire charge mechanism which is a second embodiment of the present invention.
Figure 10:
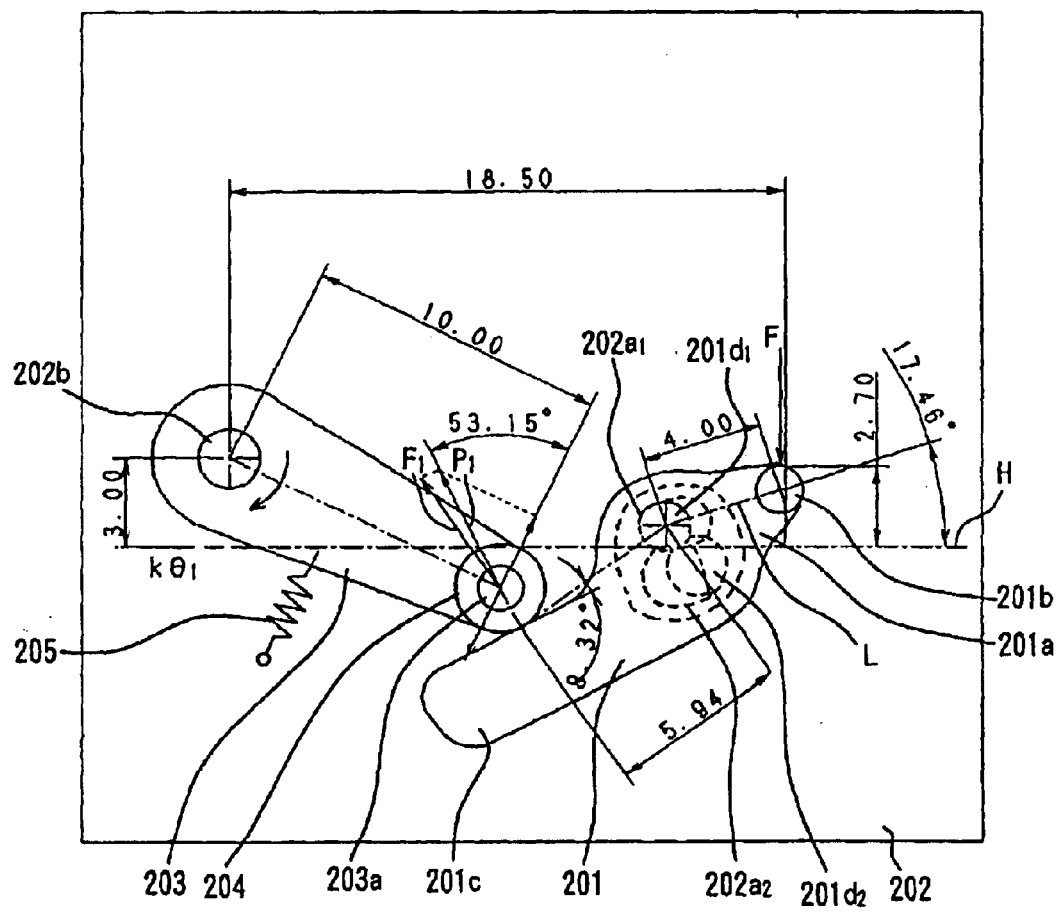
FIG. 10 is a plane view of the charge mechanism in a charging start state according to the second embodiment of the present invention.
Figure 11:
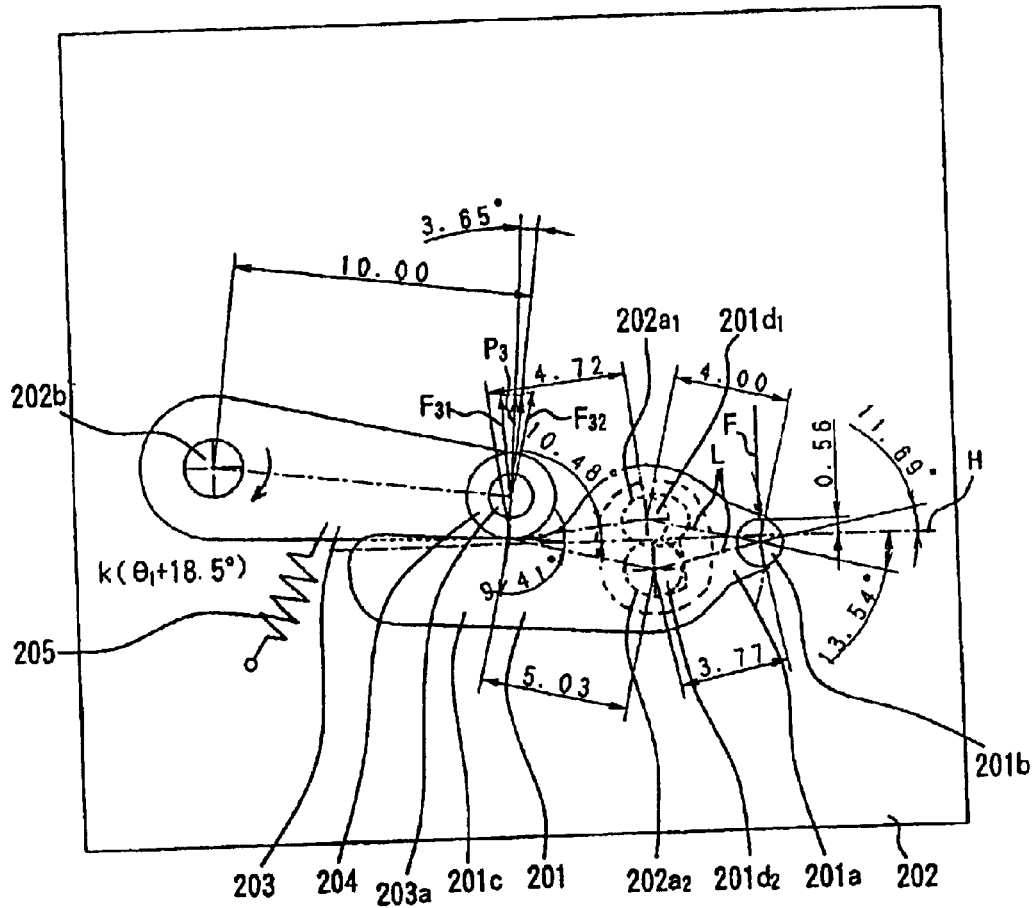
FIG. 11 is a plane view of the charge mechanism in an intermediate charging (axis switching) state according to the second embodiment of the present invention.
Figure 12:
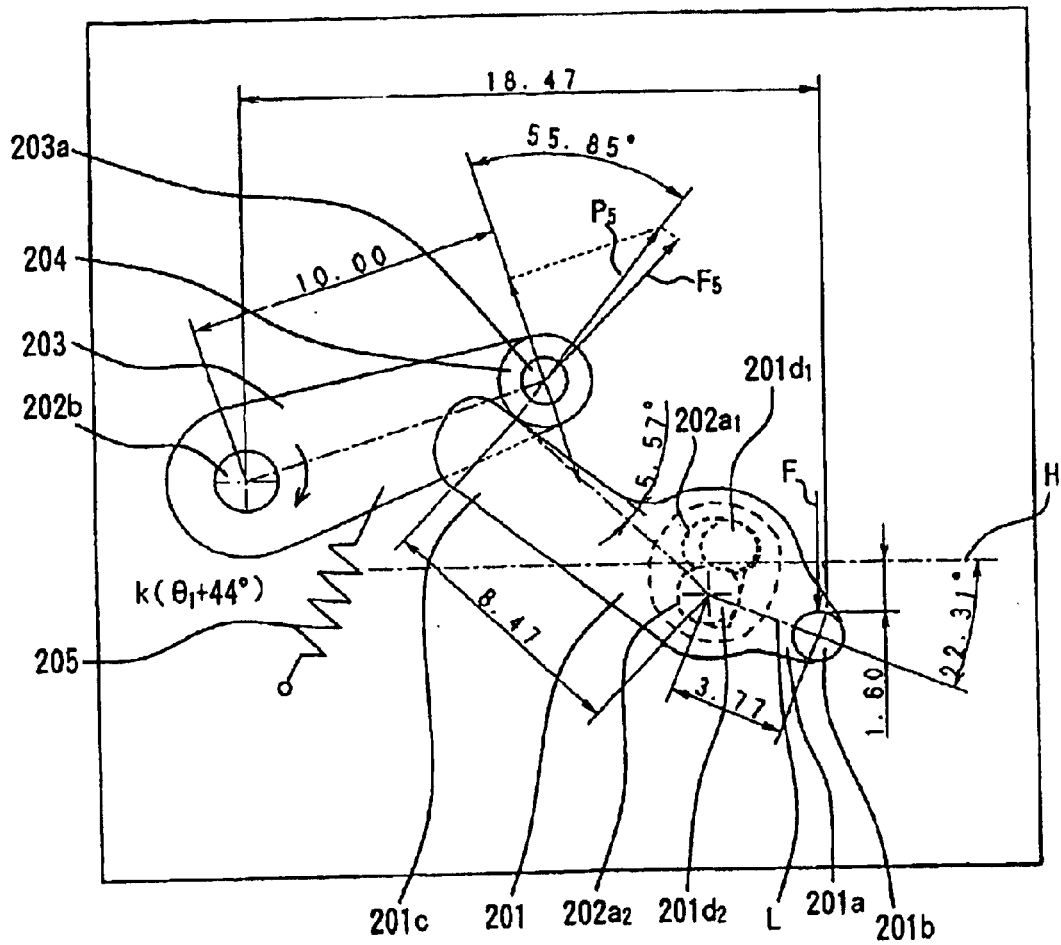
FIG. 12 is a plane view of the charge mechanism in a charging completion state according to the second embodiment of the present invention.
Figure 13:
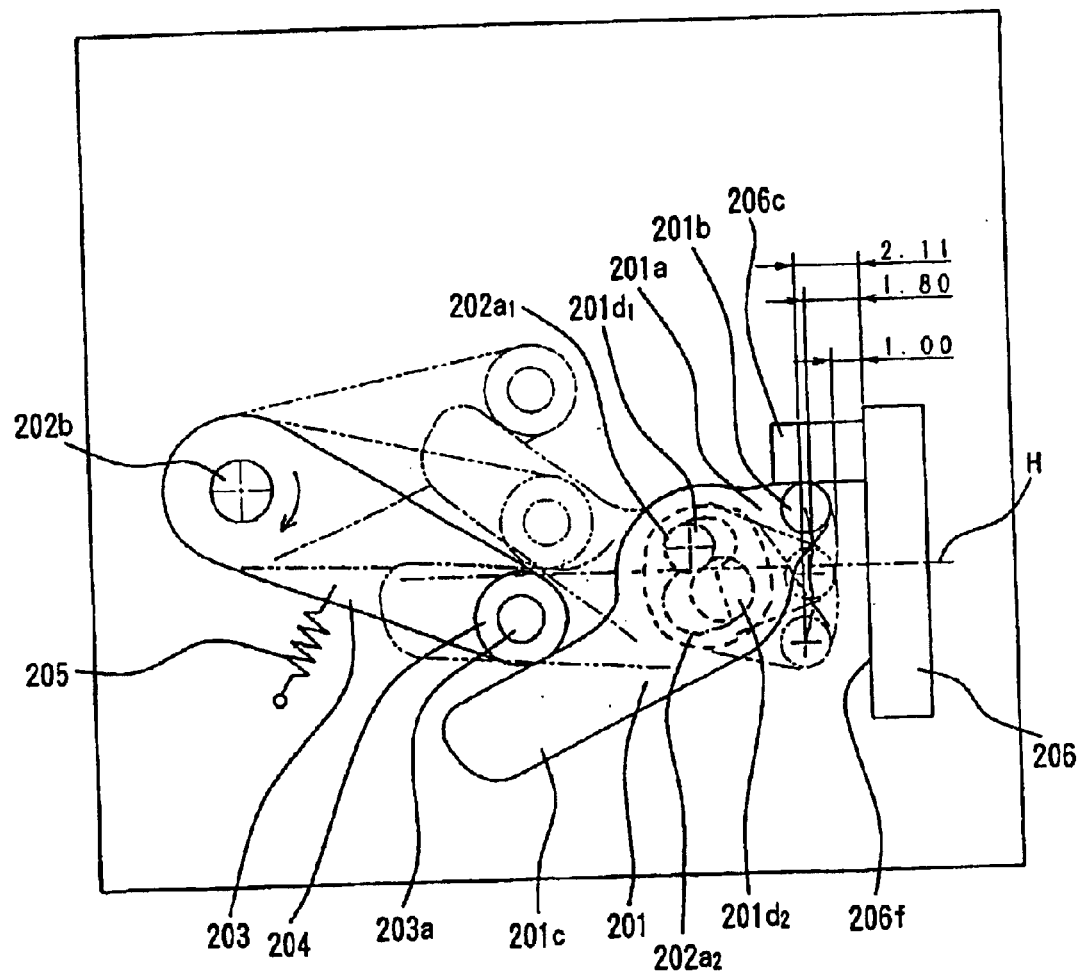
FIG. 13 is a plane view of the charge mechanism in illustrating a relationship between the charge input member and lever member according to the second embodiment of the present invention.

FIG. 9 to FIG. 12 illustrate a charge mechanism according to a second embodiment of the present invention. FIG. 9 is a perspective view of the entire charge mechanism, FIG. 10 is a plane view of the charge mechanism which a lever member 201 and driven member 203 are placed on a first base plate 202 in a charging start state, FIG. 11 is a plane view of the charge mechanism in an intermediate charging (axis switching) state, FIG. 12 is a plane view of the charge mechanism in a charging completion state and FIG. 13 is a plane view of the charge mechanism illustrating a positional relationship between the charge input member and lever member.

The charge mechanism according to this embodiment is an application of the above described first embodiment. While the first embodiment includes the first and second bearing portions formed on the lever member 1 side, this embodiment includes the first and second axial portions formed on the lever member side. The members having the same functions as those in the above described first embodiment are indicated by reference numerals with 200 added to the reference numerals assigned in the first embodiment.

In FIG. 9, reference numeral 201 denotes a lever member which is supported in a rotatable manner to a first bearing portion 202a1 and second bearing portion 202a2 laid on the first base plate 202 and pressed in the thrust directions of the first bearing portion 202a1 and second bearing portion 202a2 by a dropout prevention member (not shown) with a tiny gap.

Reference numeral 201a denotes an input side arm portion of the lever member 201 and 201b denotes an input pin laid on the input side arm portion 201a in an integrated fashion and 201c denotes an output side arm portion of the lever member 201.

Reference numeral 201d1 denotes a first axial portion which engages with the first bearing portion 202a1 and makes the lever member 201 rotatable about the center of the first bearing portion 202a1 as the rotation center and 201d2 denotes a second axial portion which engages with the second bearing portion 202a2 and makes the lever member 201 rotatable about the center of the second bearing portion 202a2 as the rotation center.

The first axial portion 201d1 engages with the substantially entire first bearing portion 202a1. The second axial portion 201d2 is formed shorter than the first axial portion 201d1 and engages with the second bearing portion 202a2 formed as the side wall of a terrace.

That is, the position of engagement between the first bearing portion 202a1 and first axial portion 201d1 and the position of engagement between the second bearing portion 202a2 and second axial portion 201d2 are provided in such a way as to be different in the thickness direction (e.g., in stepped form) of the lever member 201. This allows the rotation center of the lever member 201 to be switched between the first bearing portion 202a1 and second bearing portion 202a2 smoothly with a smaller space.

Reference numeral 203 denotes a driven member, which is supported in a manner rotatable about an axial portion 202b laid on the first base plate 202 as the rotation axis and pressed in the thrust direction of the axial portion 202b by a dropout prevention member (not shown) with a tiny gap. At one end of the driven member 203, an axial portion 203a is laid in an integrated fashion and a roller 204 is supported to the axial portion 203a in a rotatable manner. A dropout prevention member (not shown) also acts on the roller 204 in the same way.

Reference numeral 205 denotes a power spring (torsion spring) provided on the driven member 203 in such a way as to be coaxial with the axial portion 202b and its one end contacts a spring stopper 202c laid on a first base plate 202 and its other end contacts a spring stopper 203b of the driven member 203. In this way, the power spring 205 gives the driven member 203 clockwise torque about the axial portion 202b as the rotation axis.

Reference numeral 206 denotes a charge input lever and is supported in a manner rotatable about an axial portion 207a laid on a second base plate 207 (placed orthogonal to the first base plate 202) as the rotation axis and pressed in the thrust direction of the axial portion 207a by a dropout prevention member (not shown) with a tiny gap. Reference numeral 206a denotes an input side arm portion of the charge input lever 206, which receives a force Fch which rotates the charge input lever 206 counterclockwise about the axial portion 207a as the rotation axis.

Reference numeral 206b denotes an output side arm portion of the charge input lever 206. 206c denotes an output pin laid on the output side arm portion 206b in an integrated fashion, which contacts the input pin 201b of the lever member 201 and transmits the driving force to the lever member 201. Reference numeral 208 denotes a return spring, one end of which is supported by a spring stopper 207b laid on the second base plate 207 and the other end of which is hooked on to a hole 206d of the charge input lever 206. This causes the return spring 208 to give the charge input lever 206 clockwise torque about the axial portion 207a as the rotation axis.

Reference numeral 207c denotes a stopper provided on the second base plate 207 which contacts the side of the output side arm portion 206b of the charge input lever 206 and blocks the clockwise rotation of the charge input lever 206 by the return spring 208.

As described above, the charge mechanism in this embodiment has a configuration with the axial portion and the bearing portion of the charge mechanism in the first embodiment switched round.

Here, the distance between the center of the first bearing portion 202a1 and the center of the input pin 201b is 4.00 mm and the distance between the center of the second bearing portion 202a2 and the center of the input pin 201b is 3.77 mm, that is, these distances are set to substantially the same length. This can suppress drastic variations of load when the engagement between the first axial portion 201d1 and the first bearing portion 202a1 is switched to the engagement between the second axial portion 201d2 and the second bearing portion 202a2 during the rotation of the lever member 201.

Furthermore, to reduce (that is, reduce axial loss) the component force in the direction of the rotation axis of the lever member 1 of the force that the input pin 201b receives from the output pin 206c of the charge input lever 206, the total rotation angle of the lever member 201 about the first bearing portion 202a1 and second bearing portion 202a2 as the rotation axes is set to 65° (31°+34°).

That is, the total rotation angle of the lever member 201 is set to be greater than 39.77° which is the sum of angle 17.46° formed by the straight line (L) connecting the center of the first bearing portion 202a1 and the center of the input pin 201b at the start of charging (see FIG. 10) and the straight line (H) orthogonal to the direction of the force applied to the input pin 201b, and angle 22.31° formed by the straight line (L) connecting the center of the second bearing portion 202a2 and the center of the input pin 201b when charging is completed (see FIG. 12) and the straight line (H) orthogonal to the direction of the force applied to the input pin 201b.

Then, the operation of the charge mechanism in such a configuration will be explained below.

First, when a force Fch is applied to the input side arm portion 206a of the charge input lever 206, the charge input lever 206 rotates counterclockwise (FIG. 9) about the axial portion 207a as the rotation axis. This causes the output pin 206c on the output side arm portion 206b to push the input pin 201b on the input side arm portion 201a, causes the first axial portion 201d1 to contact the first bearing portion 202a1, making the lever member 201 rotate clockwise about the first bearing portion 202a1 as the rotation axis.

This causes the output side arm portion 201c of the lever member 201 to push the roller 204 against the force of the power spring 205 and makes the driven member 203 rotate counterclockwise about the axial portion 202b as the rotation axis.

Here, if the second axial portion 201d2 contacts the second bearing portion 202a2 in the middle of rotation of the lever member 201, the first engaged portion 202a1 disengages from the first axial portion 201d1 and the lever member 201 rotates clockwise about the second bearing portion 202a2 as the rotation axis. That is, the rotation center of the lever member 201 is switched from the first axial portion to the second axial portion. Then, charging is finished when the lever member 201 has rotated a predetermined angle.

On the other hand, when the force Fch is no longer applied in a charging completion state, the lever member 201 goes the opposite way of the charging process by the force of the power spring 205 and returns to the charging start state.

The operation of the charge mechanism and charging load (FIGS. 10 to 13) according to this embodiment are the same as the operation of the charge mechanism (FIGS. 2 to 6, FIG. 8) according to the first embodiment including the dimensional relationship, and therefore explanations thereof will be omitted.

The table and graph showing the relationship between the rotation angle of the driven member 203 and the input load of the lever member 201 are the same as those in FIG. 7. Therefore, the charge mechanism according to this embodiment has the following merits compared to the conventional charge mechanism.

First, since the torsion moment applied to the charge input lever 206 is by far small and the charge input lever 206 is not tilted, axial loss during rotation and friction loss due to contact between the charge input lever 206 and the second base plate 207 during rotation are small and the operation efficiency is high.

Furthermore, loss by friction between the output pin 206c and input pin 201b is small and the operation efficiency is high, which allows the overall charging load in the charge mechanism to be reduced drastically. Furthermore, the size in the width direction is reduced by 2.60 (conventional value)−2.11 (value in this embodiment)=0.49 mm, thus contributing to miniaturization.

(Third Embodiment)

A third embodiment of the present invention relates to a focal plane shutter (hereinafter simply referred to as a "shutter apparatus") provided with the charge mechanism according to the first embodiment. The shutter apparatus according to this embodiment is mounted on the single-lens reflex camera, etc., shown in FIG. 21 and FIG. 22.

Figure 21:
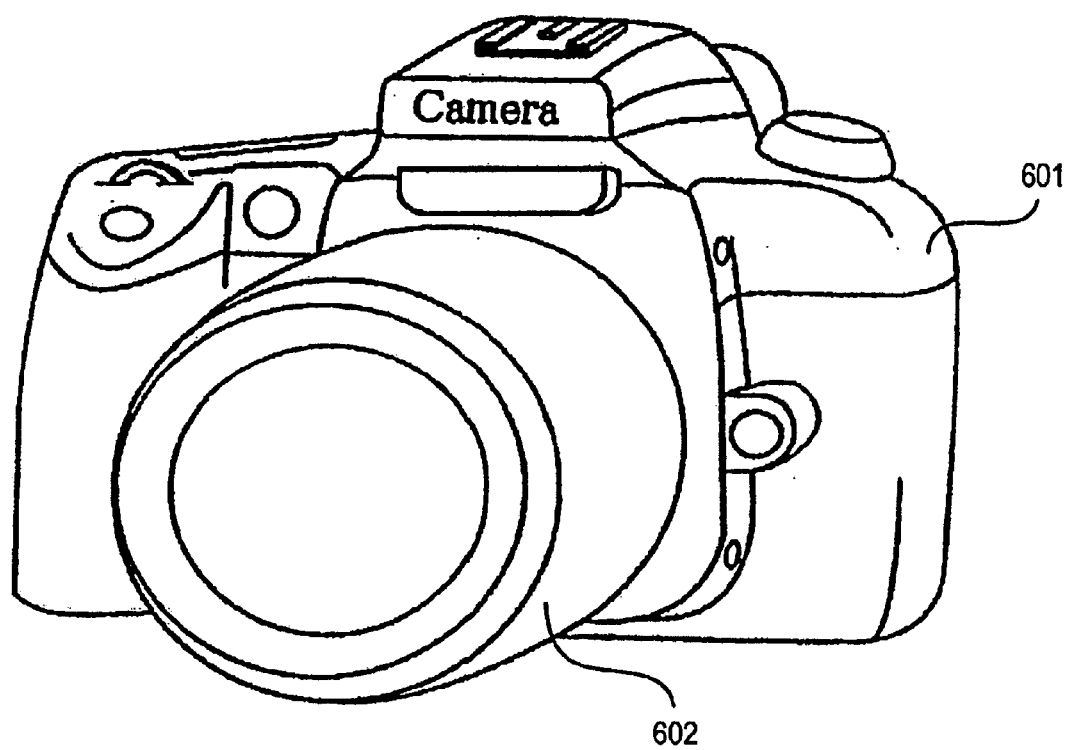
FIG. 21 is an outside perspective of a camera.
Figure 22:
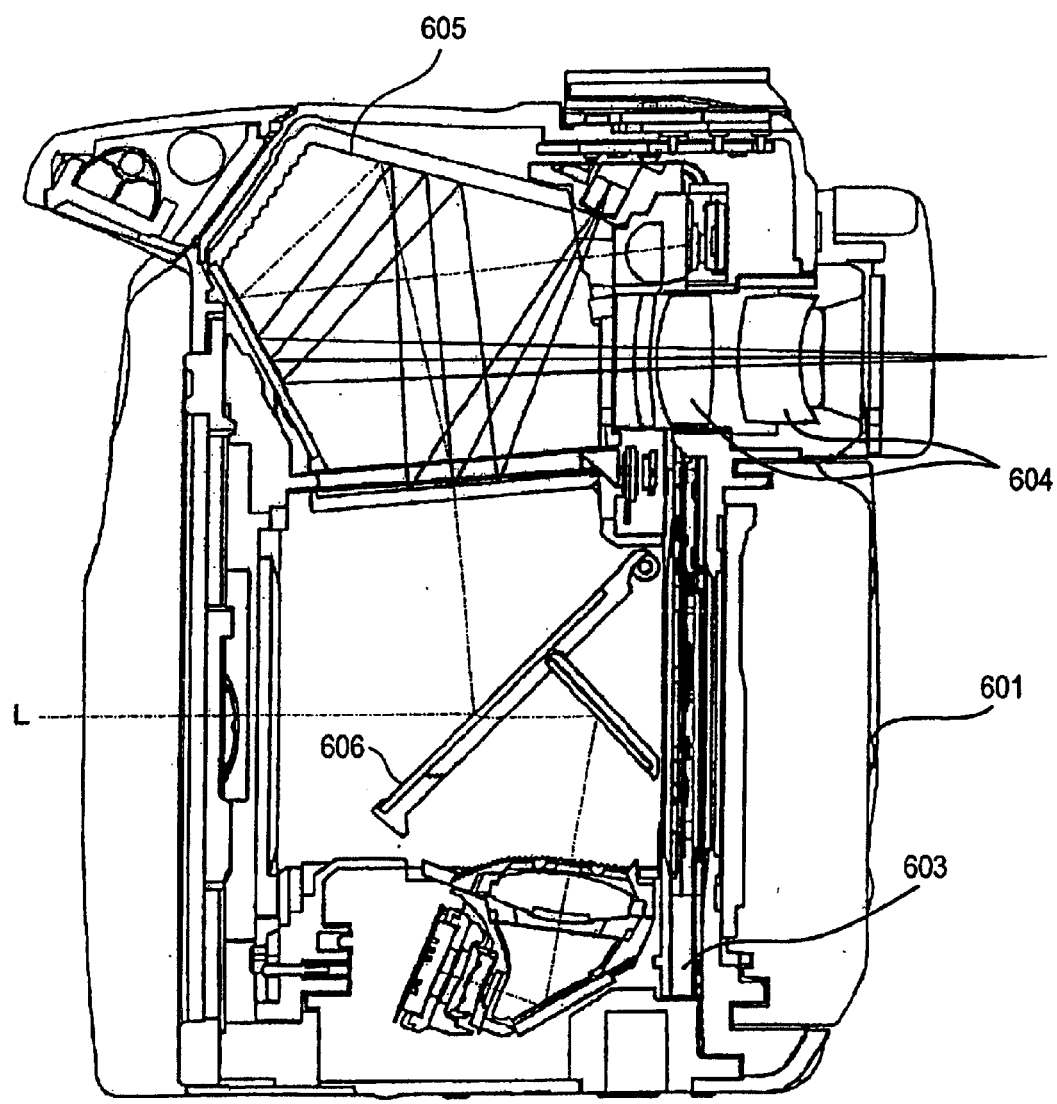
FIG. 22 is a longitudinal sectional view of the camera body.
Figure 23:
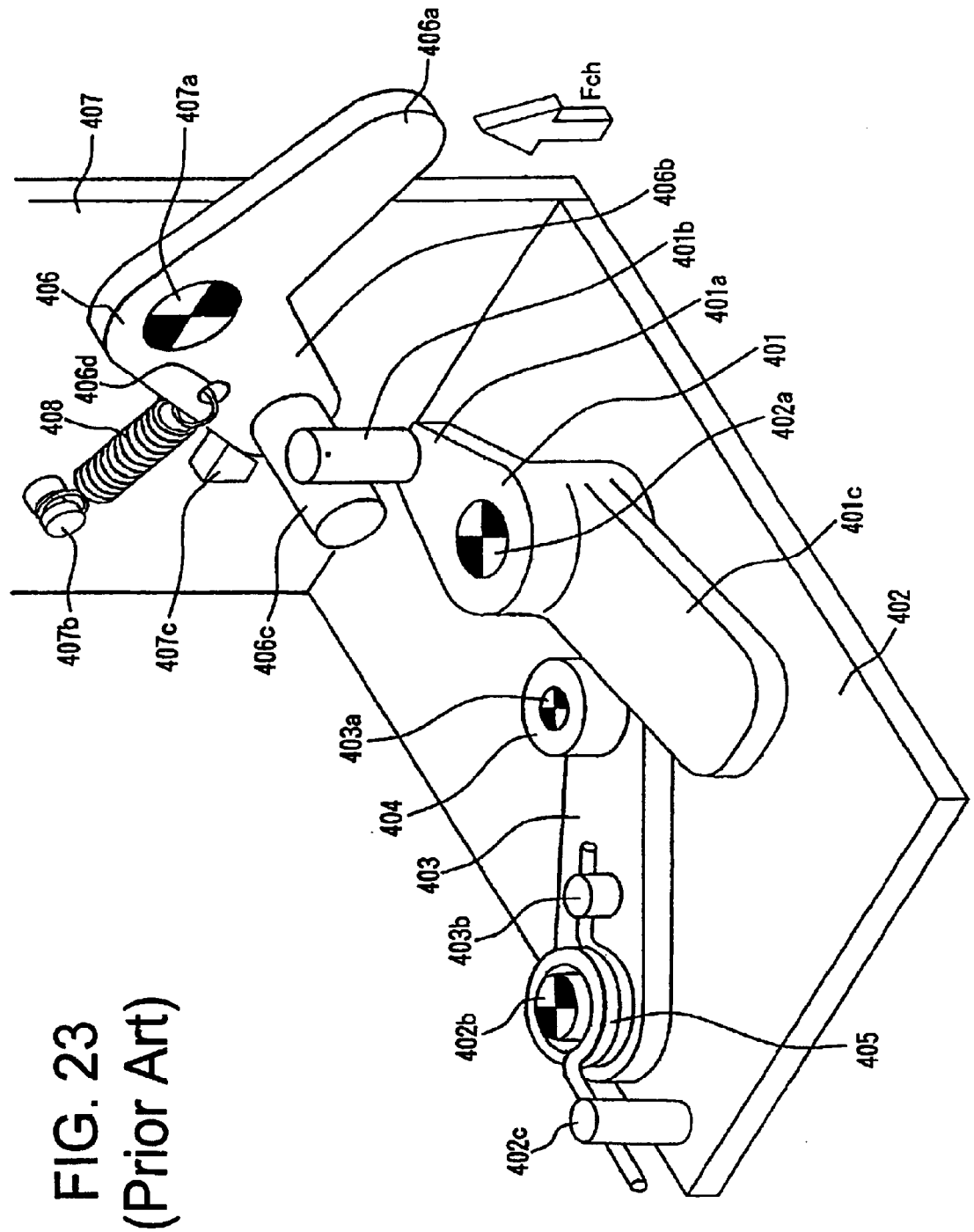
FIG. 23 is a perspective view of an entire charge mechanism of a conventional technology.
Figure 24:
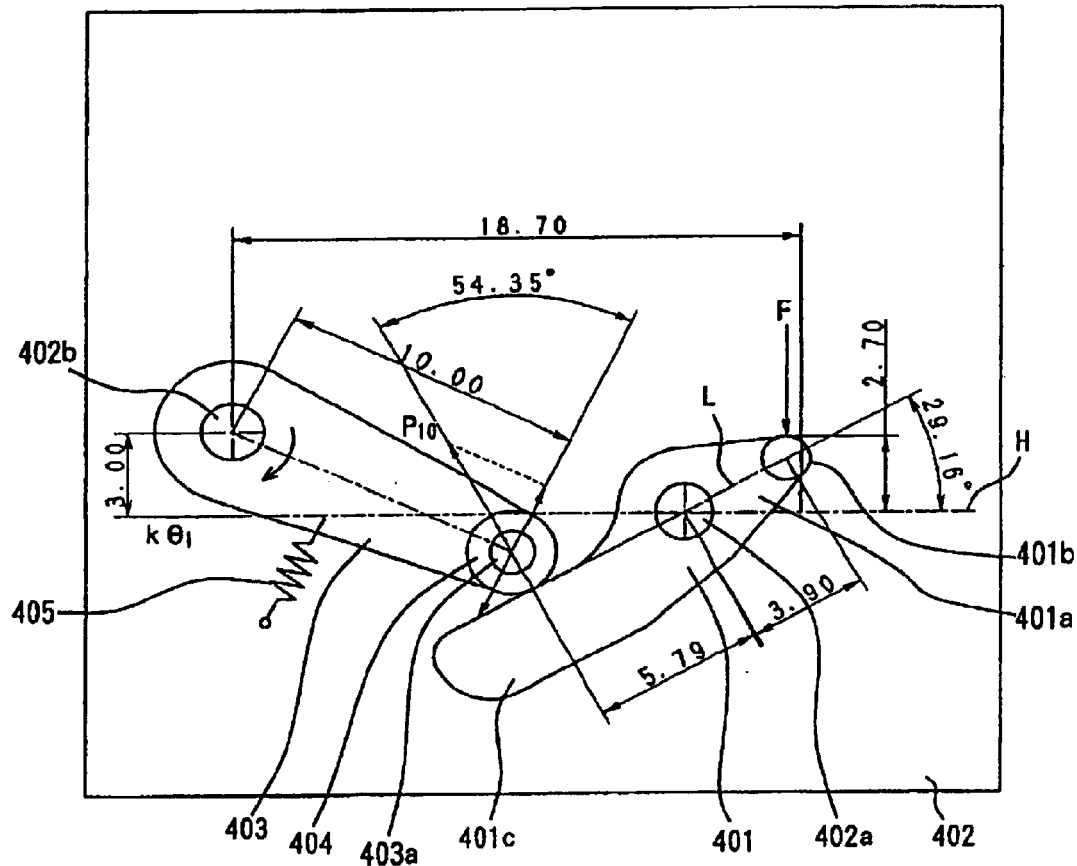
FIG. 24 is a plane view of a conventional charge mechanism in a charging start state.
Figure 25:
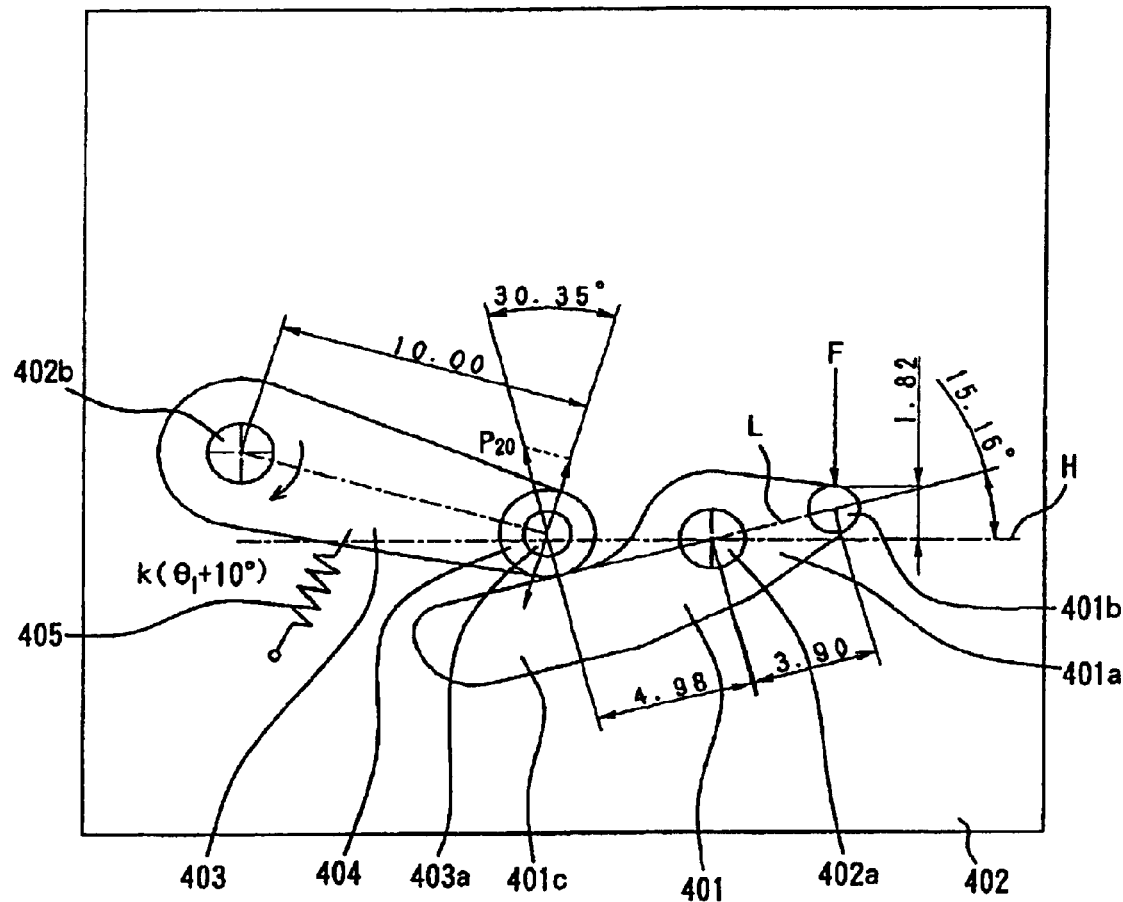
FIG. 25 is a plane view of the conventional charge mechanism in a first half charging state.
Figure 26:
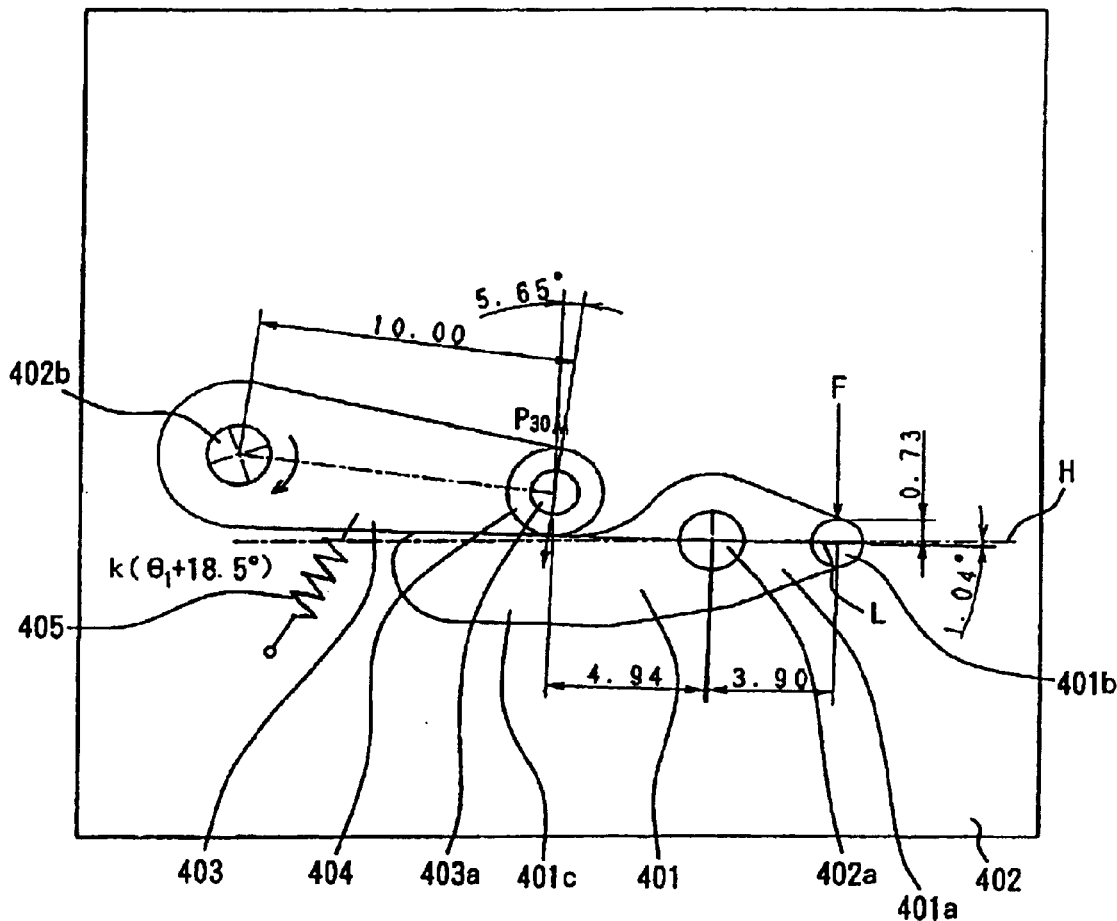
FIG. 26 is a plane view of the conventional charge mechanism in an intermediate charging (axis switching) state.
Figure 27:
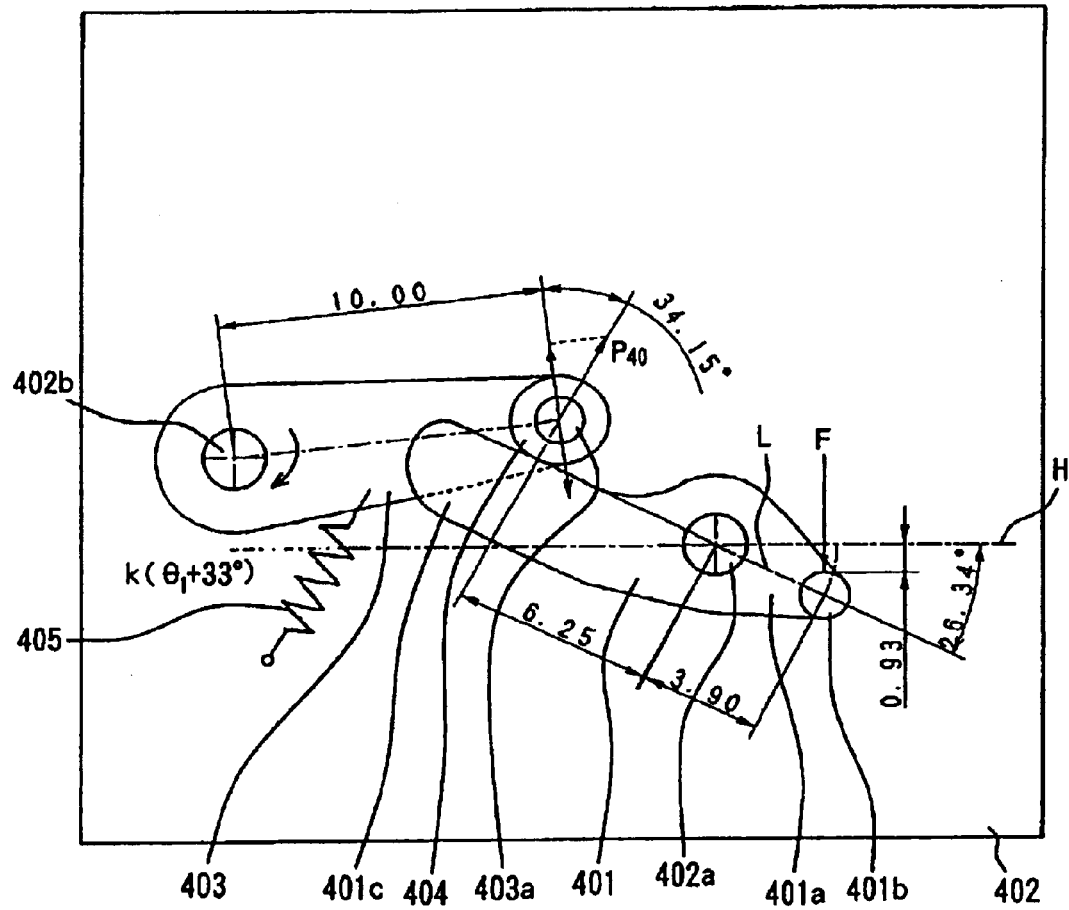
FIG. 27 is a plane view of the conventional charge mechanism in a second half charging state.
Figure 28:
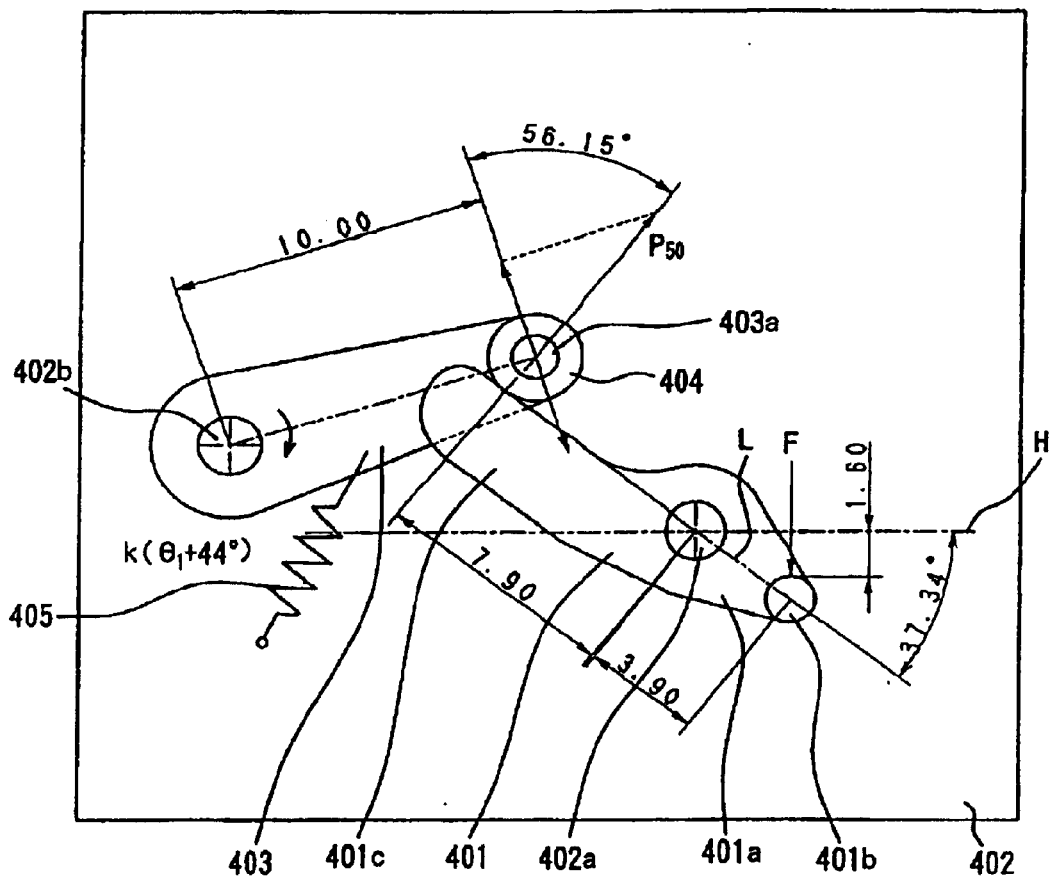
FIG. 28 is a plane view of the conventional charge mechanism in a charging completion state.

In FIG. 21 and FIG. 22, a lens apparatus 602 provided with an image-taking lens is mounted on a camera body 601 in an attachable/detachable manner. As shown in FIG. 22, the camera body 601 is provided with a shutter apparatus 603 of this embodiment.

Here, when a reflective mirror 606 is placed diagonally in the image-taking optical path, an object beam L which has pass d through the lens apparatus 602 is reflected at the reflective mirror 606 and led to an eyepiece 604 through a pentaprism 605. On the other hand, when the reflective mirror 606 is out of the image-taking optical path, the object beam L is directed toward the shutter apparatus 602 and an image is taken by running of a shutter of the shutter apparatus 602.

The shutter apparatus of this embodiment will be explained using FIGS. 14 to 20 below. The charge mechanism used for the shutter apparatus which will be described below differs from the charge mechanism of the first embodiment in some points, but has the same basic configuration and function. Furthermore, of the components of the shutter apparatus which will be explained below, suppose the components with the same names as those of the components of the aforementioned charge mechanism of the first embodiment have the same functions.

Figure 14:
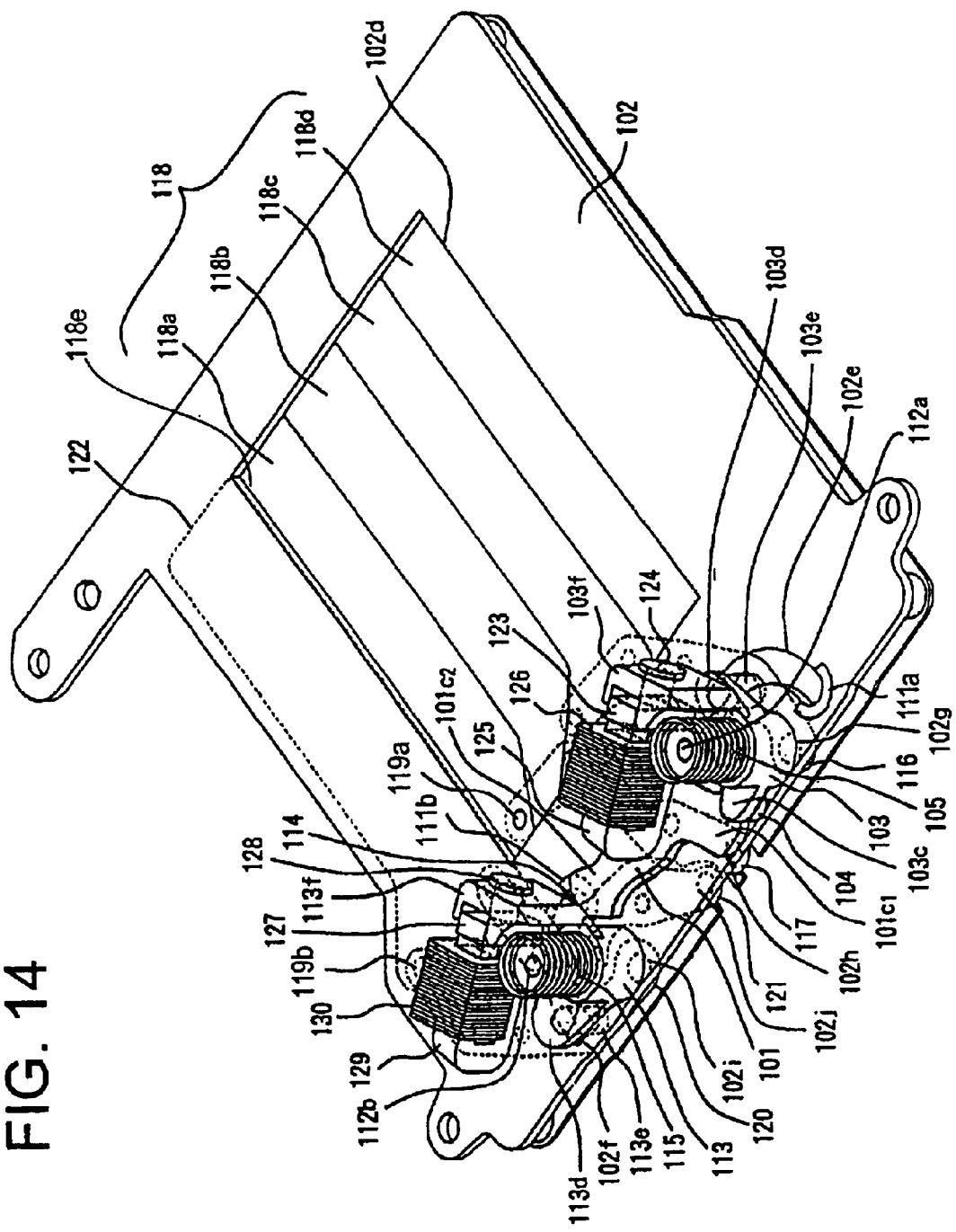
FIG. 14 is an outside perspective view of a shutter apparatus according to a third embodiment of the present invention.
Figure 15:
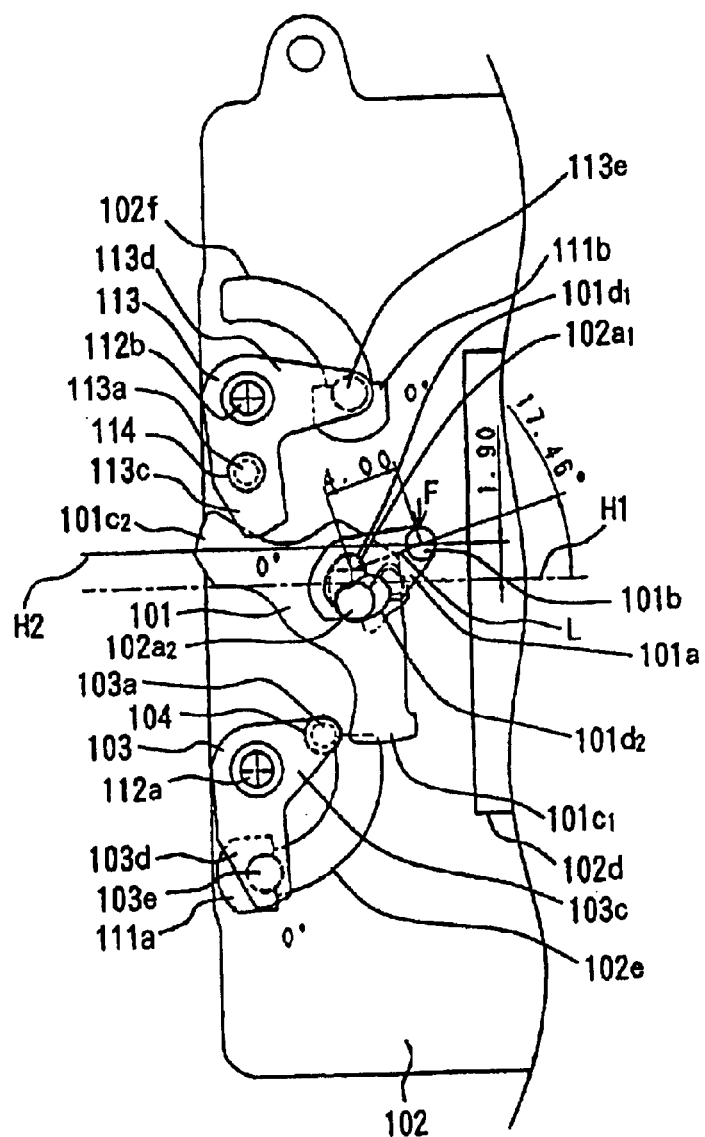
FIG. 15 is a front view of part of the shutter apparatus in a charging start state.
Figure 16:
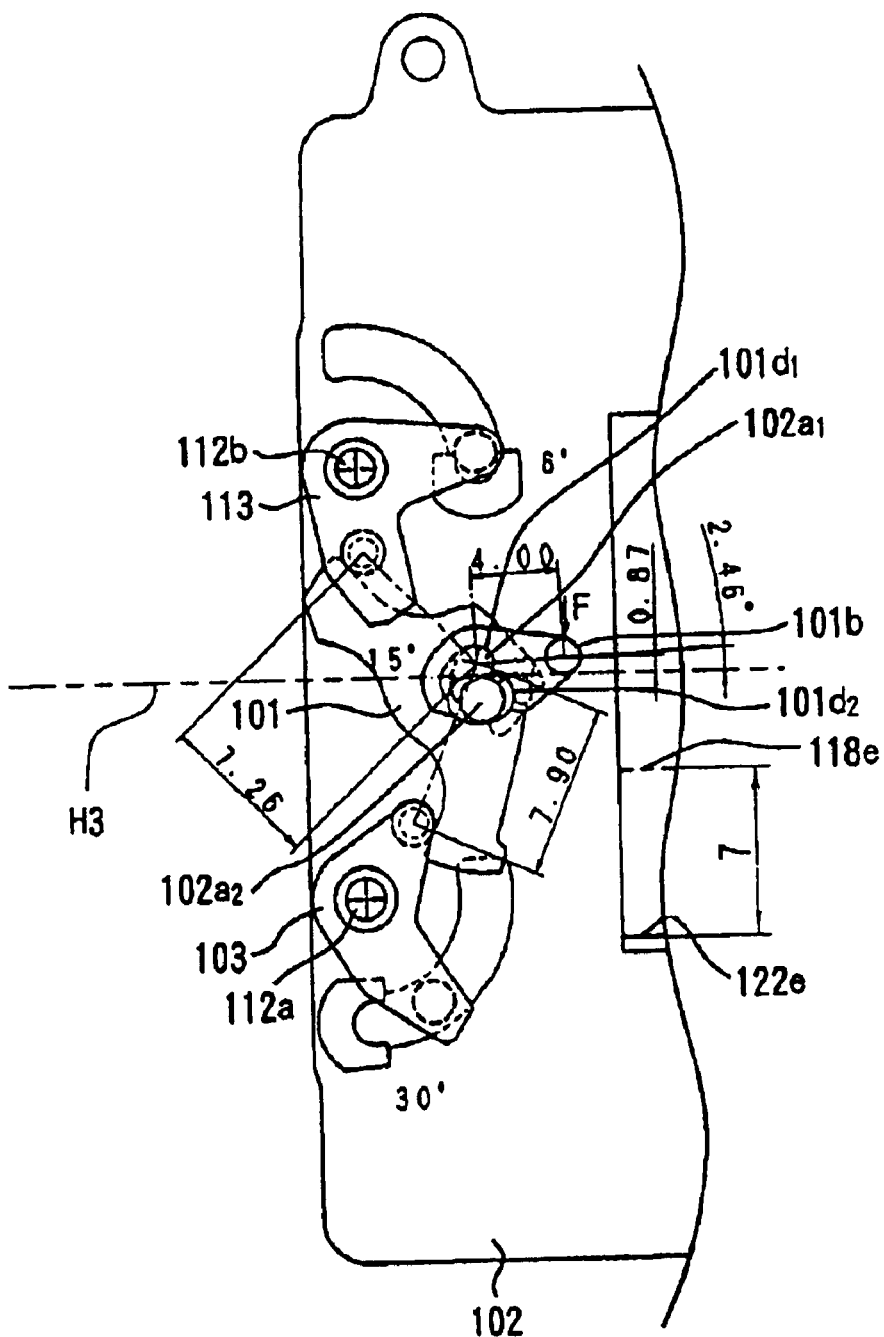
FIG. 16 is a front view of part of the shutter apparatus in a first half charging state.
Figure 17:
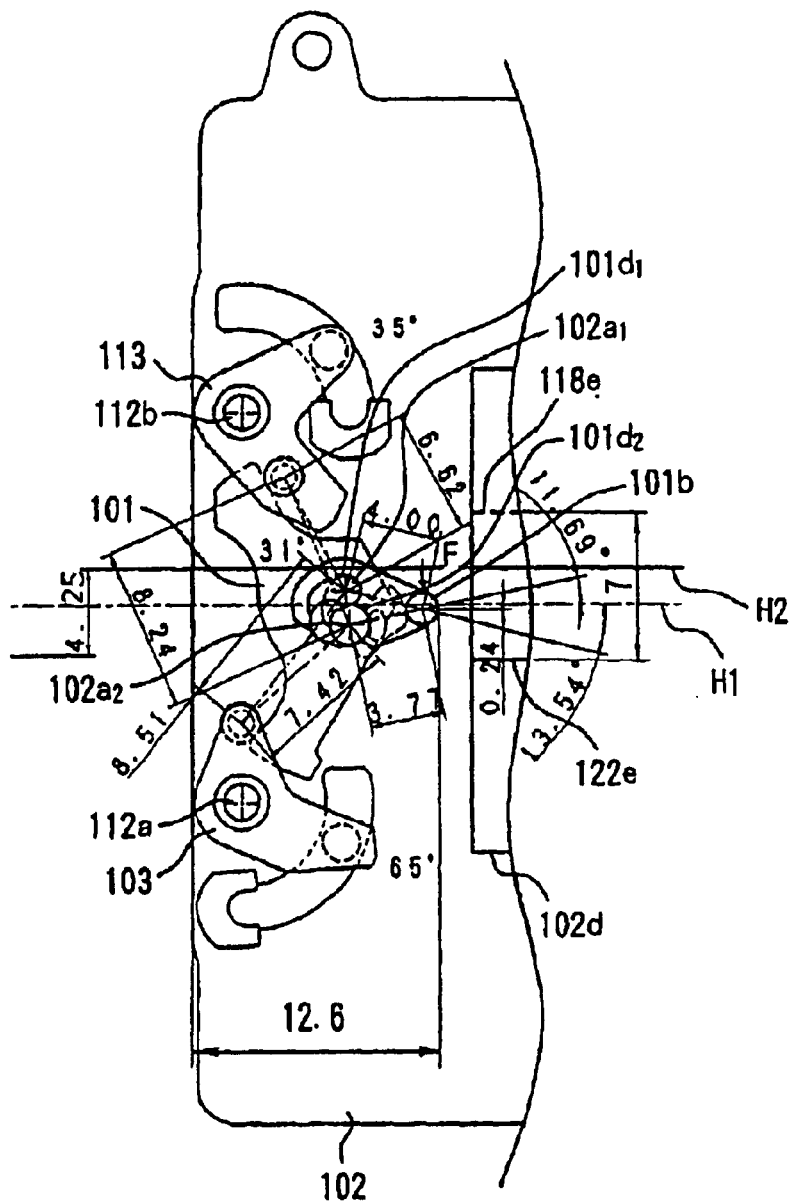
FIG. 17 is a front view of part of the shutter apparatus in an intermediate charging (axis switching) state.

FIG. 14 is an outside perspective view of the shutter apparatus of this embodiment, FIG. 15 is a plane view of the shutter apparatus from completion of running to a charging start state and FIG. 16 is a plane view of the shutter apparatus in a first half charging state. FIG. 17 is a plane view of the shutter apparatus in an intermediate charging (range in which the rotation center of the charge lever changes from the first axial portion to the second axial portion) state.

Figure 18:
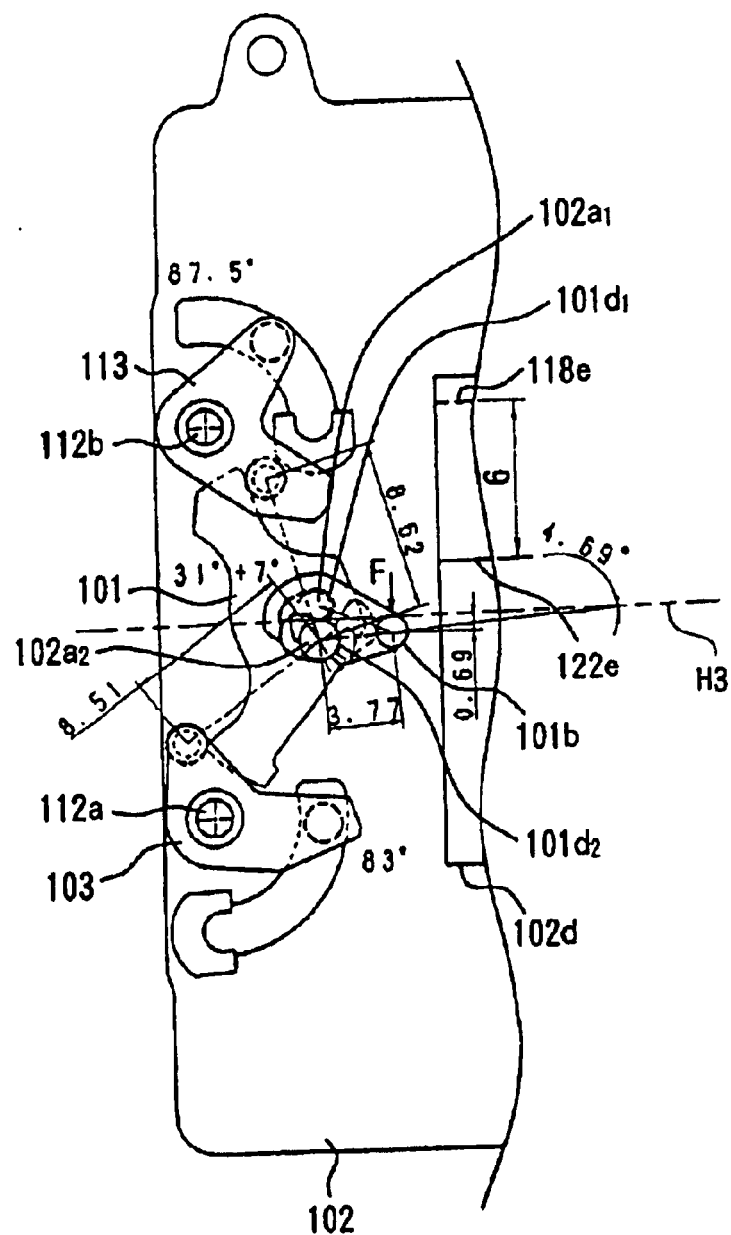
FIG. 18 is a front view of part of the shutter apparatus in a second half charging state.
Figure 19:
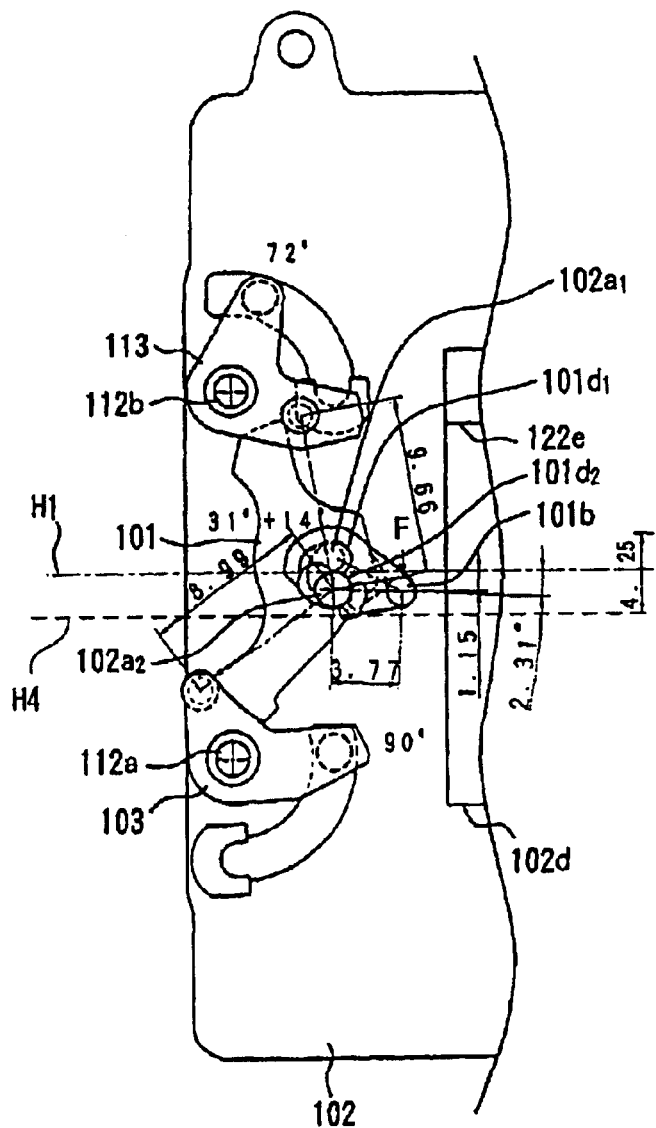
FIG. 19 is a front view of part of the shutter apparatus in a state immediately before completion of charging.
Figure 20:
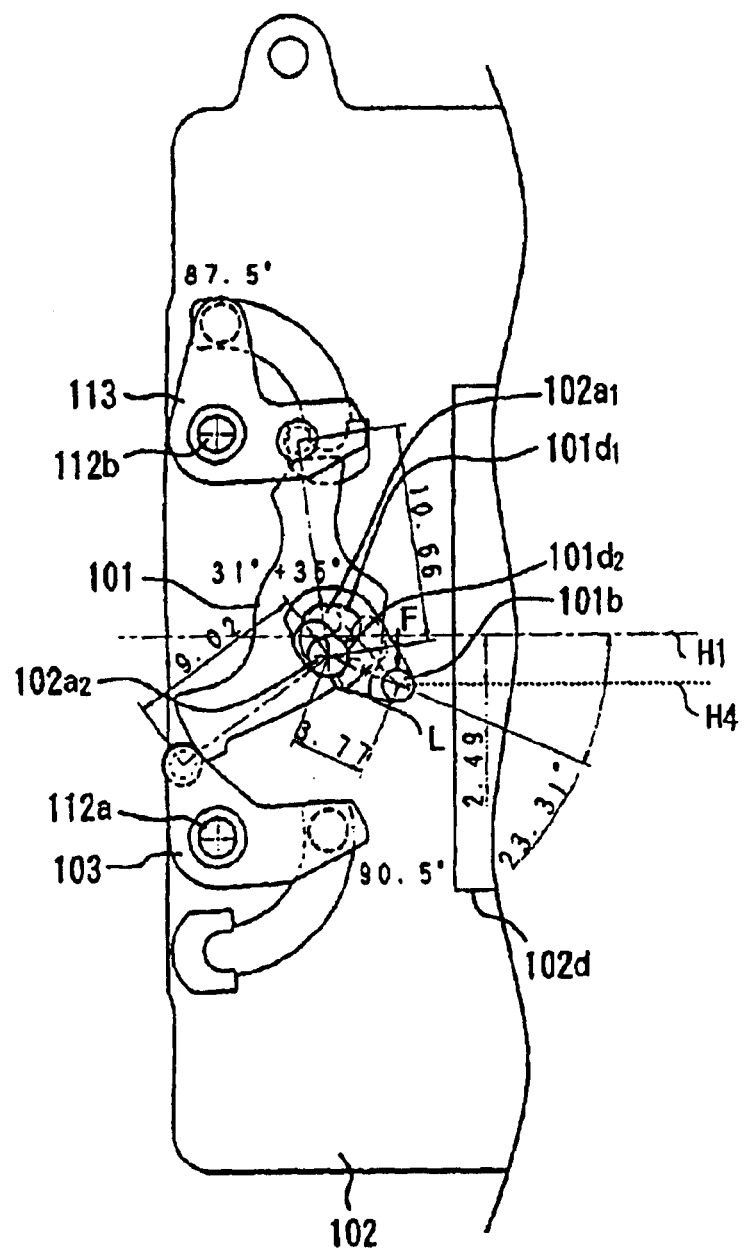
FIG. 20 is a front view of part of the shutter apparatus in an overcharge state.

FIG. 18 is a plane view of the shutter apparatus in a second half charging state, FIG. 19 is a plane view of the shutter apparatus in a state immediately before completion of charging and FIG. 20 is a plane view of the shutter apparatus in an overcharge state.

In FIG. 14 to FIG. 20, reference numeral 101 denotes a charge lever (corresponds to the lever member 1 in the first embodiment), which is supported in a manner rotatable about a first axial portion 102a1 and a second axial portion 102a2 laid on a shutter base plate 102 as the rotation axes and pressed in the thrust directions of these axial portions 102a1 and 102a2 by a dropout prevention member (not shown) with a tiny gap.

Reference numeral 101a denotes an input side arm portion (corresponds to the input side arm portion 1a) of the charge lever 101, 101b denotes an input pin laid on the input side arm portion 101a in an integrated fashion, 101c1 denotes a front curtain side output arm portion (corresponds to the output side arm portion 1c) of the charge lever 101, 101c2 denotes a rear curtain side output arm portion (corresponds to the output side arm portion 1c) of the charge lever 101.

Reference numeral 101d1 denotes a first bearing portion which engages with the first axial portion 102a1 and makes the charge lever 101 rotatable about the first axial portion 102a1 and 101d2 denotes a second bearing portion which engages with the second axial portion 102a2 and makes the charge lever 101 rotatable about the second axial portion 102a2.

The first bearing portion 101d1 is hidden in FIGS. 15 to 20 and expressed with a dotted line. It is formed inside the charge lever 101 (side facing the shutter base plate 102), provided in a position different from the second bearing portion 101d2 in the height direction (direction perpendicular to the plane of the sheet in FIGS. 15 to 20). Then, the first bearing portion 101d1 and the second bearing portion 101d2 are formed in a staircase pattern.

That is, the position of engagement between the first axial portion 102a1 and first bearing portion 101d1 differs from the position of engagement between the second axial portion 102a2 and second bearing portion 101d2 in the axial directions of the first and second axial portions.

This allows the rotation center of the charge lever 101 to be switched between the first axial portion 102a1 and second axial portion 102a2 smoothly with a smaller space. Reference numeral 103 denotes a front curtain driving lever (corresponds to the driven member 3) which is supported in a manner rotatable about the axial portion 112a as the rotation axis which is laid on the shutter base plate 102 and is pressed in the thrust direction of the axial portion 112a by a dropout prevention member (not shown) with a tiny gap.

At the end of an arm portion 103c of the front curtain driving lever 103, an axial portion 103a is laid in an integrated fashion and a roller 104 is supported to the axial portion 103a in a rotatable manner. Here, the shutter base plate 102 acts as a dropout stopper of the roller 104.

At the end of the other arm portion 103d of the front curtain driving lever 103, the front curtain driving pin 103e is laid in an integrated fashion. Reference numeral 105 denotes a power spring (torsion spring) which is provided on the front curtain driving lever 103 in such a way as to be coaxial with the axial portion 112a. This one end contacts a shutter speed adjustment member (not shown) and the other end contacts a spring stopper (not shown) of the front curtain driving lever 103. This causes the power spring 105 to give the front curtain driving lever 103 clockwise torque about the axial portion 112a as the rotation axis.

Reference numeral 116 denotes a front curtain main arm, which is supported in a manner rotatable about an axial portion 102g as the rotation axis laid on the shutter base plate 102. Reference numeral 117 denotes a front curtain sub-arm, which is supported in a manner rotatable about the axial portion 102h as the rotation axis laid on the shutter base plate 102.

Reference numeral 118 denotes a blade group making up the front curtain and reference numeral 118a of this blade group denotes a slit formation blade (first blade) and includes a slit formation portion 118e. Reference numeral 118b denotes a second blade, 118c denotes a third blade and 118d denotes a fourth blade. Each blade of the blade group 118 is supported in a rotatable manner to the front curtain main arm 116 and front curtain sub-arm 117 by a caulking dowel 119a etc., and both arms 116 and 117 and each blade forms a parallel link (publicly known configuration).

Furthermore, as shown in FIG. 14, an armature holding portion 103f is formed above the arm portion 103d of the front curtain driving lever 103 and the armature holding portion 103f holds a magnet armature 123 by means of an armature axis 124 with a certain degree of freedom of movement.

Reference numeral 125 denotes a yoke and 126 denotes a coil wound around the yoke 125 and these are fixed to a base plate (not shown). When power is supplied to the coil 126, the yoke 125 attracts and holds the armature 123 and releases the armature 123 when the power supply to the coil 126 is interrupted. Shutter timing is controlled using this operation.

Reference numeral 113 denotes a rear curtain driving lever, which is supported in a manner rotatable about an axial portion 112b as the rotation axis laid on the shutter base plate 102 and pressed in the thrust direction of the axial portion 112b by a dropout suppression member (not shown) with a tiny gap. At one arm portion 113c of the rear curtain driving lever 113, an axial portion 113a is laid in an integrated fashion and the roller 114 is supported to the axial portion 113a in a rotatable manner.

The shutter base plate 102 operates as a dropout prevention member for the roller 114. At the end of the other arm portion 113d of the rear curtain driving lever 113, a rear curtain driving pin 113e is laid in an integrated fashion. Reference numeral 115 denotes a power spring (torsion spring), which is placed on the rear curtain driving lever 113 in such a way as to be coaxial with the axial portion 112b.

One end of the power spring 115 contacts a shutter speed adjustment member (not shown) and the other end contacts a spring stopper (not shown) of the rear curtain driving lever, which gives the rear curtain driving lever 113 clockwise torque about the axial portion 112b as the rotation axis.

Reference numeral 120 denotes a rear curtain main arm, which is supported in a manner rotatable about an axial portion 102i as the rotation axis laid on the shutter base plate 102. Reference numeral 121 denotes a rear curtain sub-arm, which is supported in a manner rotatable about an axial portion 102j as the rotation axis laid on the shutter base plate 102.

Reference numeral 122 denotes a blade group constituting a rear curtain which is constructed of four blades as in the case of the front curtain. One of the blade group 122 includes a slit formation portion (indicated by reference numeral 122e in FIG. 16 to FIG. 18) which forms a slit together with the slit formation blade 118a. Each blade of the blade group 122 is supported in a rotatable manner to the above described rear curtain main arm 120 and rear curtain sub-arm 121 using a caulking dowel 119b, etc., and both arms 120 and 121 and each blade together forms a parallel link (publicly known configuration).

Furthermore, an armature holding portion 113f is formed above the arm portion 113c of the rear curtain driving lever and an armature holding portion 113f holds a magnet armature 127 by means of the armature axis 128 with a certain degree of freedom of movement.

Reference numeral 129 denotes a yoke and 130 denotes a coil wounded around the yoke 129, which are fixed to a base plate (not shown). The yoke 129 attracts and holds the armature 127 when power is supplied to the coil 130 and releases the armature 127 when the power supply to the coil 130 is interrupted. Shutter timing is controlled using the above described operation.

Reference numeral 102d denotes an aperture through which light passes formed on the shutter base plate 102. Reference numeral 102e denotes a long hole portion which is formed on the shutter base plate along a movement track of the front curtain driving pin 103e and 102f denotes a long hole portion which is formed on the shutter base plate 102 along a movement track of the rear curtain driving pin 113e. Reference numerals 111a and 111b denote buffering members which receive the front curtain driving pin 103e and rear curtain driving pin 113e respectively when running of each shutter (front curtain and rear curtain) is completed.

The charge mechanism of the shutter apparatus of this embodiment reduces the size of the apparatus by setting the width from the input pin 101b laid on the input side arm portion 101a in an integrated fashion to the end of the shutter apparatus (left end of the shutter apparatus) to 12.6 mm and setting the stroke of the input pin 101b (distance between straight line H2 and straight line H4) in the longitudinal direction in FIGS. 15 to 20 to 4.25 mm.

Furthermore, a charge input lever (not shown) which contacts the input pin 101b of the charge lever 101 and gives the charge lever 101 torque in the same configuration as the charge input lever 6 in FIG. 1.

The distance between the center of the first axial portion 102a1 and the center of the input pin 101b is 4.00 mm and the distance between the center of the second axial portion 102a2 and the center of the input pin 101b is 3.77 mm, that is, these distances are set to substantially the same length. This can suppress drastic variations of load when the rotation center of the charge lever member 101 is switched from the first axial portion 102a1 to the second axial portion 102a2 in the middle of rotation of the charge lever member 101.

Furthermore, to reduce (that is, reduce axial loss) the component force in the direction of the rotation axis of the charge lever member 101 of the force that the input pin 101b receives from the output pin of the charge input lever (not shown), the total rotation angle of the charge lever 101 about the first axial portion 102a1 and second axial portion 102a2 as the rotation axes is set to 66° (31°+35°).

That is, the total rotation angle of the charge lever 101 is set to be greater than 39.77° which is the sum of angle 17.46° formed by the straight line (L) connecting the center of the first axial portion 102a1 and the center of the input pin 101b at the start of charging and the straight line (H) orthogonal to the direction of the force applied to the input pin 101b, and angle 22.31° formed by the straight line (L) connecting the center of the second axial portion 102a2 and the center of the input pin 101b when charging is completed and the straight line (H) orthogonal to the direction of the force applied to the input pin 101b.

Then, the operation of the shutter apparatus and charge mechanism thereof in such a configuration will be explained. First, when a charging force Fch (not shown) is applied to the charge input lever (not shown) from the charging start state in FIG. 15 as in case of the charge mechanism according to the first embodiment, the charge input lever pushes the input pin 101b on the input side arm portion 101a of the charge lever 101.

This causes the first bearing portion 101d1 to contact the first axial portion 102a1, making the charge lever 101 rotate clockwise about the first axial portion 102a1 as the rotation axis.

This causes the front curtain side output arm portion 101c of the charge lever 101 to push the roller 104 and makes the front curtain driving lever 103 rotate counterclockwise about the axial portion 112b as the rotation axis against the force of the power spring 105. Furthermore, the rear curtain side output arm portion 101c2 pushes the roller 114 and makes the rear curtain driving lever 113 rotate counterclockwise about the axial portion 112b as the rotation axis against the force of the power spring 115. This is the first half charging state shown in FIG. 16.

Figure 30:
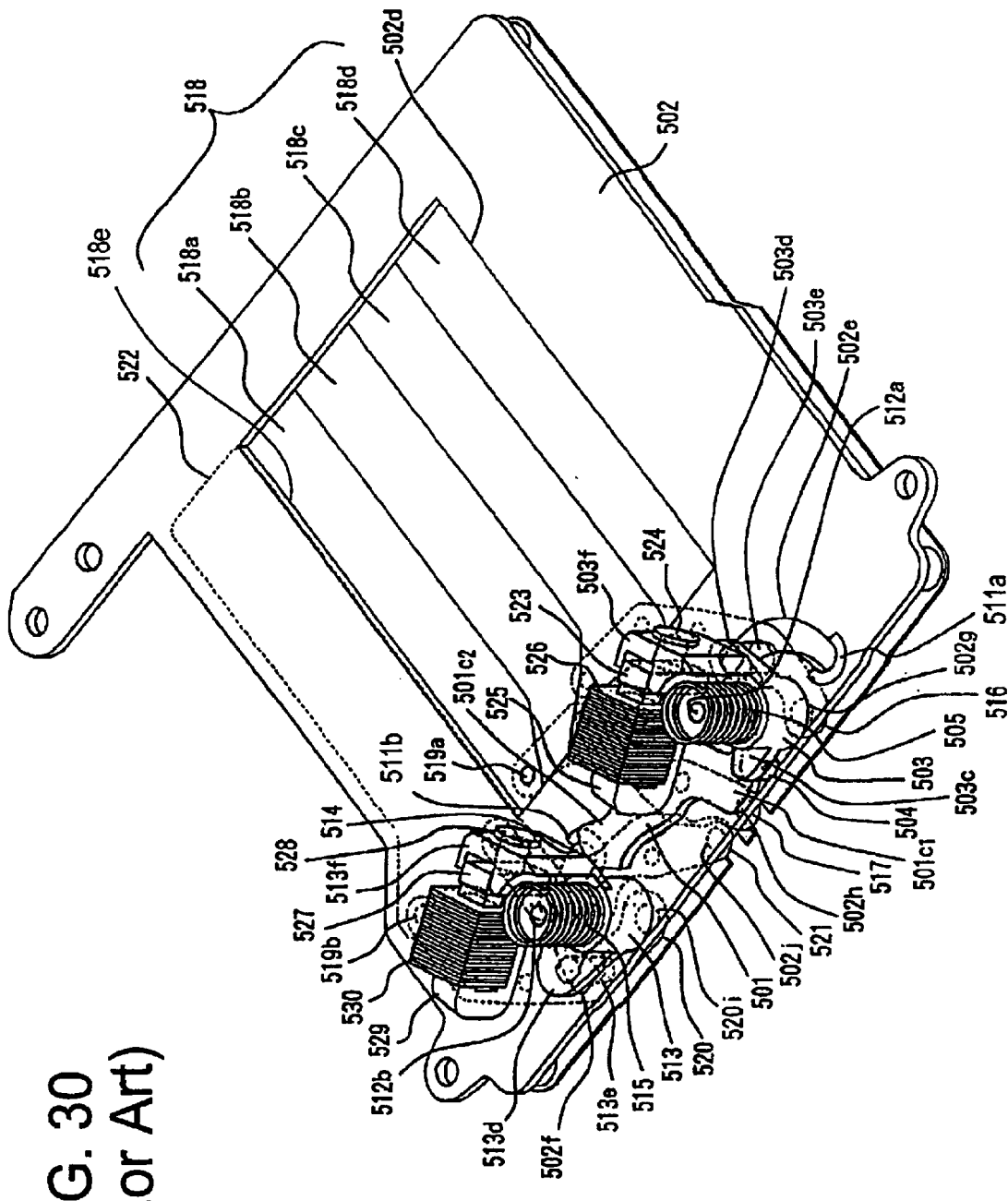
FIG. 30 is an outside perspective view of the shutter apparatus of the conventional technology.

When compared to the state diagram of the first half charging state of the shutter apparatus using the conventional charge mechanism, the charging force is reduced by approximately 10% and the amount of overlapping (indicated by the distance between the slit formation portions 118e and 122e of the front curtain and rear curtain) between the front curtain and rear curtain in the first half charging state is 7 mm as shown in FIG. 16 and FIG. 17, which is 2 mm greater than 5 mm of the conventional shutter apparatus (FIG. 30) and provides high light-shielding performance.

Furthermore, in the middle of charging, when the rotatable axis of the charge lever 101 in FIG. 17 is switched, the moment the first bearing portion 101d1 engages with the first axial portion 102a1, the second bearing portion 101d2 engages the second axial portion 102a2.

Figure 31:
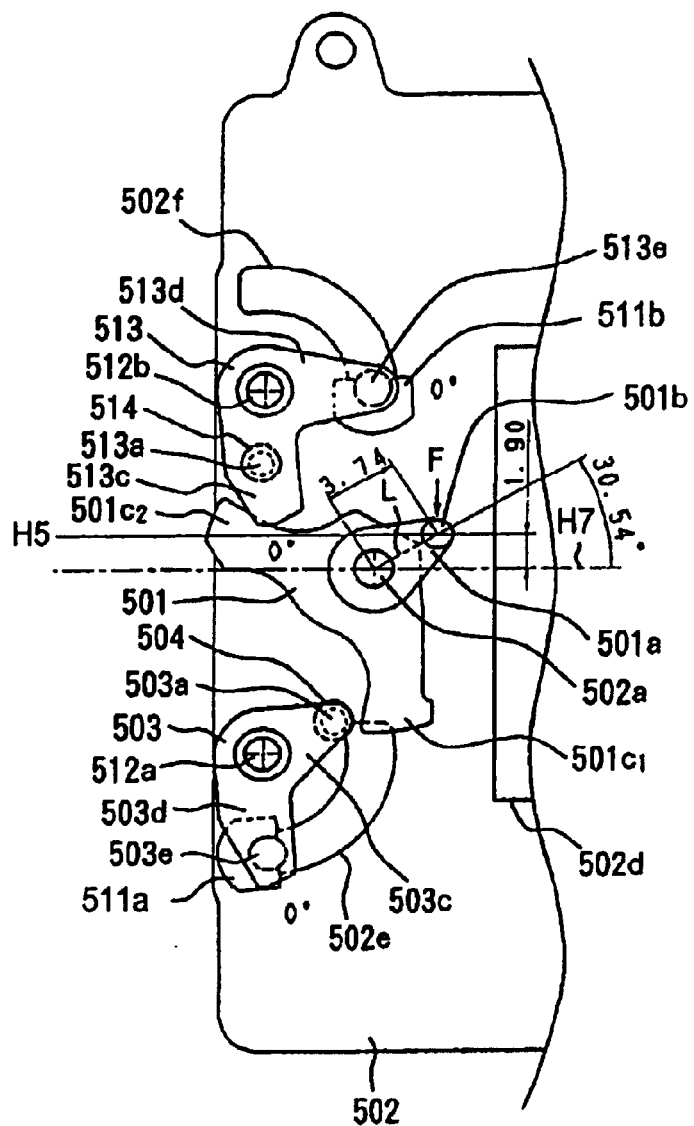
FIG. 31 is a front view of part of the conventional shutter apparatus in a charging start state.

Compared to the state diagram in the middle of charging of the shutter apparatus using the conventional charge mechanism, the charging force remains substantially the same, but the amount of overlapping between the front curtain and rear curtain during charging (indicated by the distance between the slit formation portion 118e of the front curtain and the slit formation sections 122e of the rear curtain) is 7 mm, which is 1.5 mm greater than 5.5 mm of the conventional shutter apparatus (FIG. 31) and provides high light-shielding performance.

After a while, the first bearing portion 101d1 is disengaged from the first axial portion 102a1 and the charge lever 101 rotates clockwise about the second axial portion 102a2 as the rotation axis (that is, the rotation center of the charge lever is switched from the first rotation axis to the second rotation axis). This is the second half charging state shown in FIG. 18.

Figure 32:
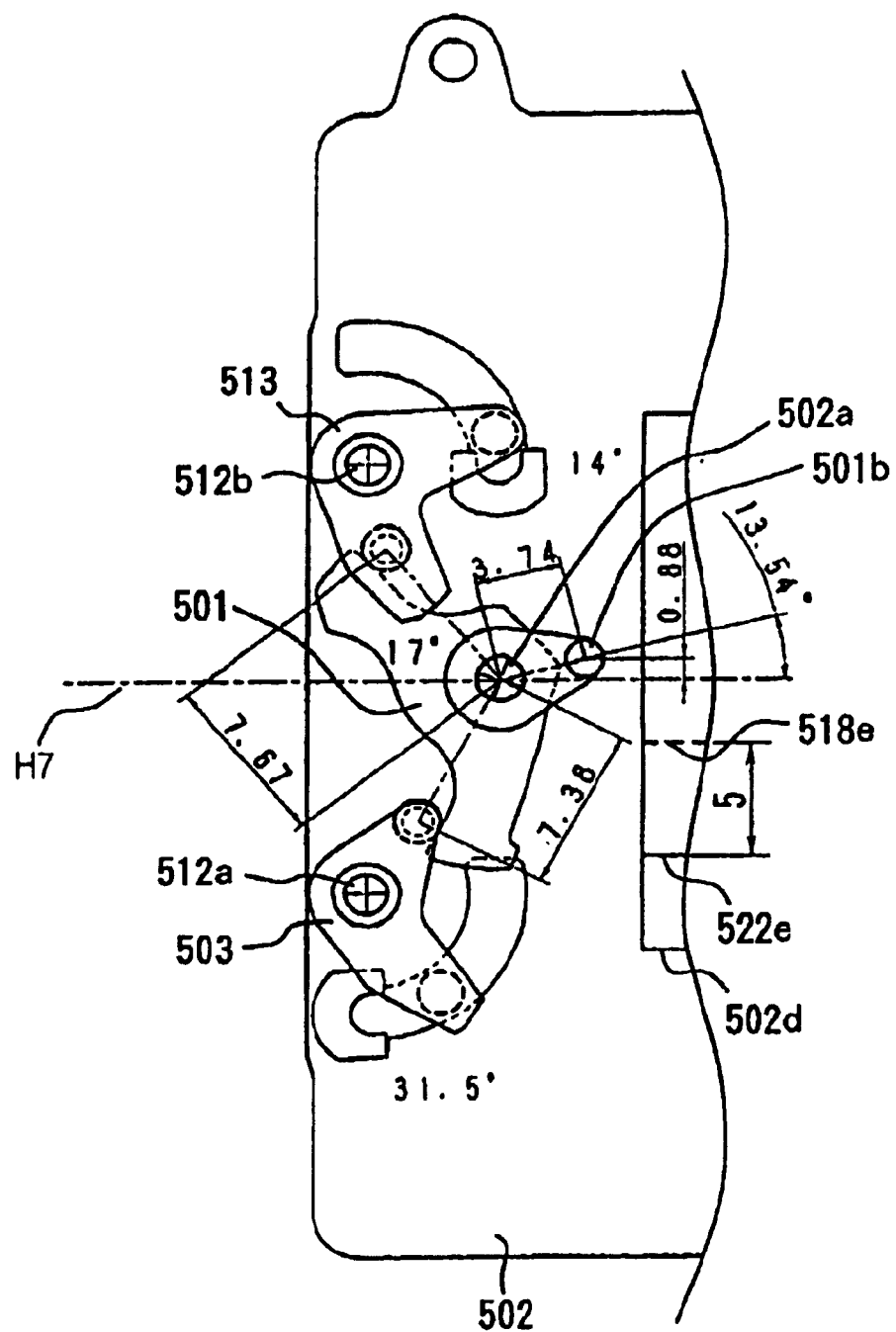
FIG. 32 is a front view of part of the conventional shutter apparatus in a first half charging state.
Figure 33:
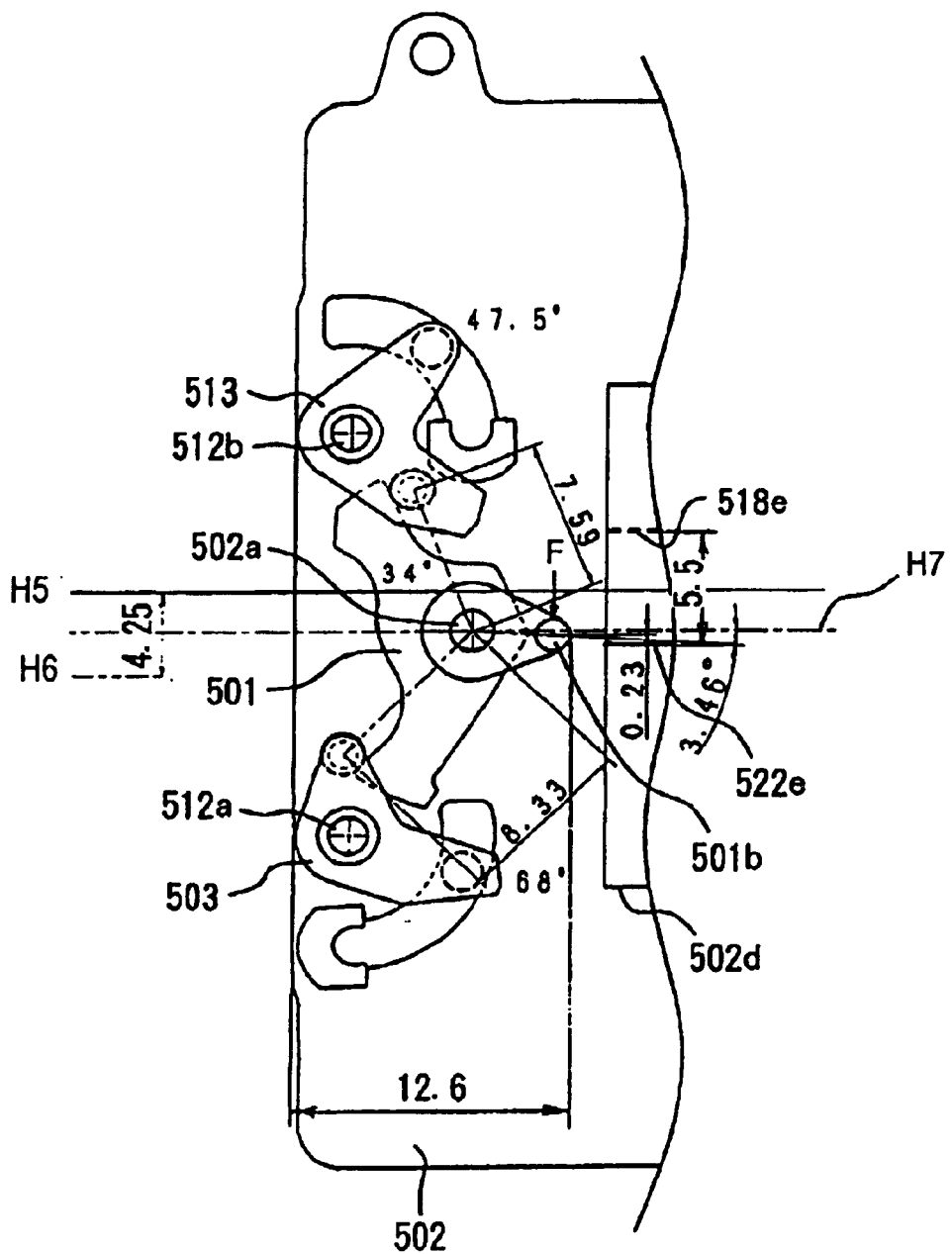
FIG. 33 is a front view of part of the conventional shutter apparatus in an intermediate charging (axis switching) state.
Figure 34:
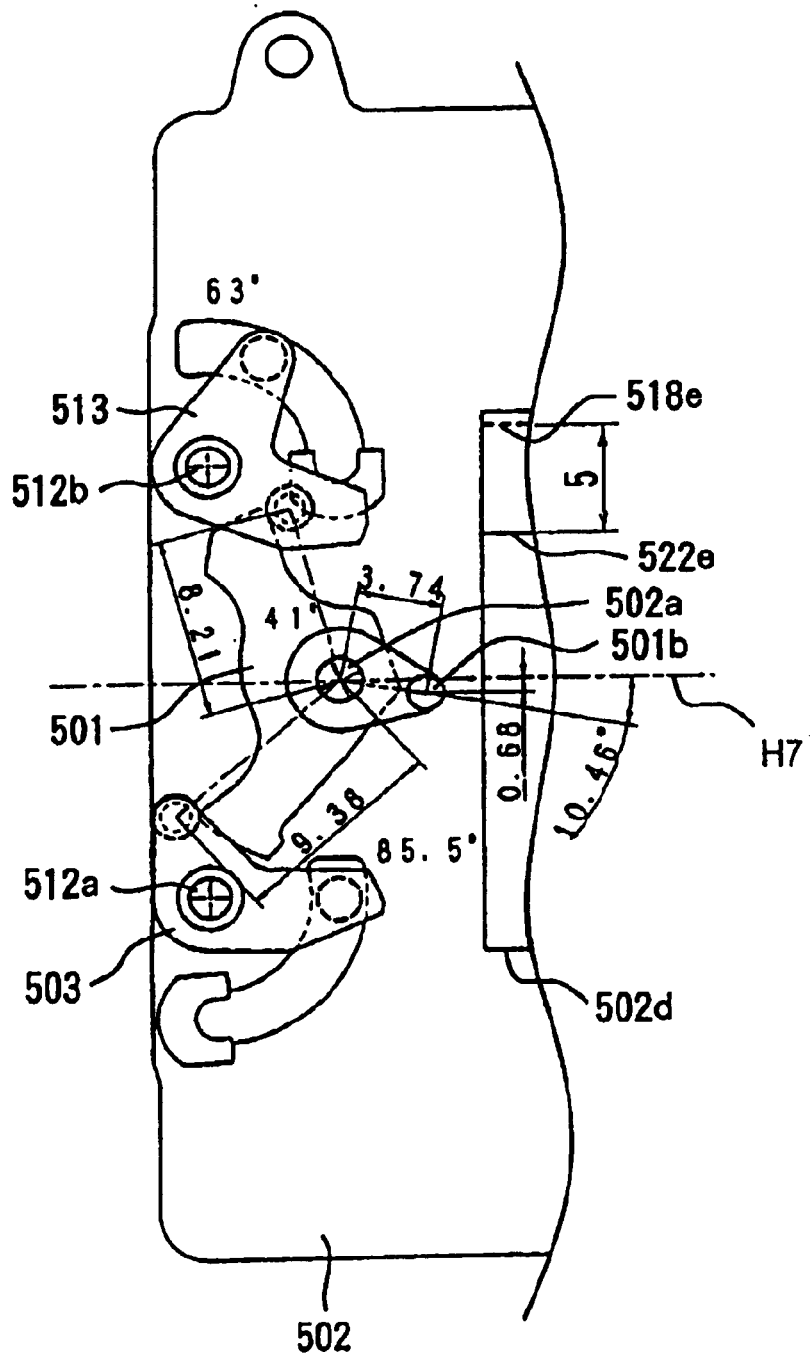
FIG. 34 is a front view of part of the conventional shutter apparatus in a second half charging state.
Figure 35:
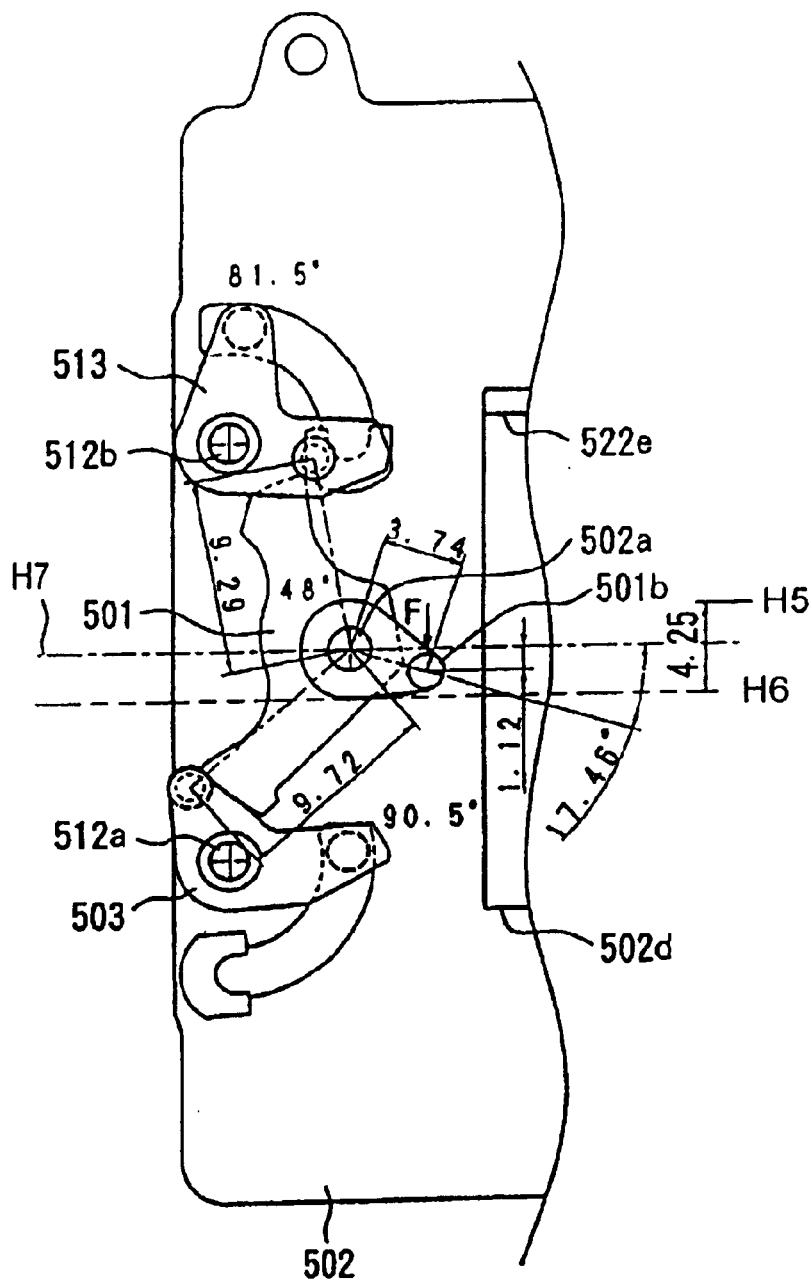
FIG. 35 is a front view of part of the conventional shutter apparatus in a state immediately before completion of charging.
Figure 36:
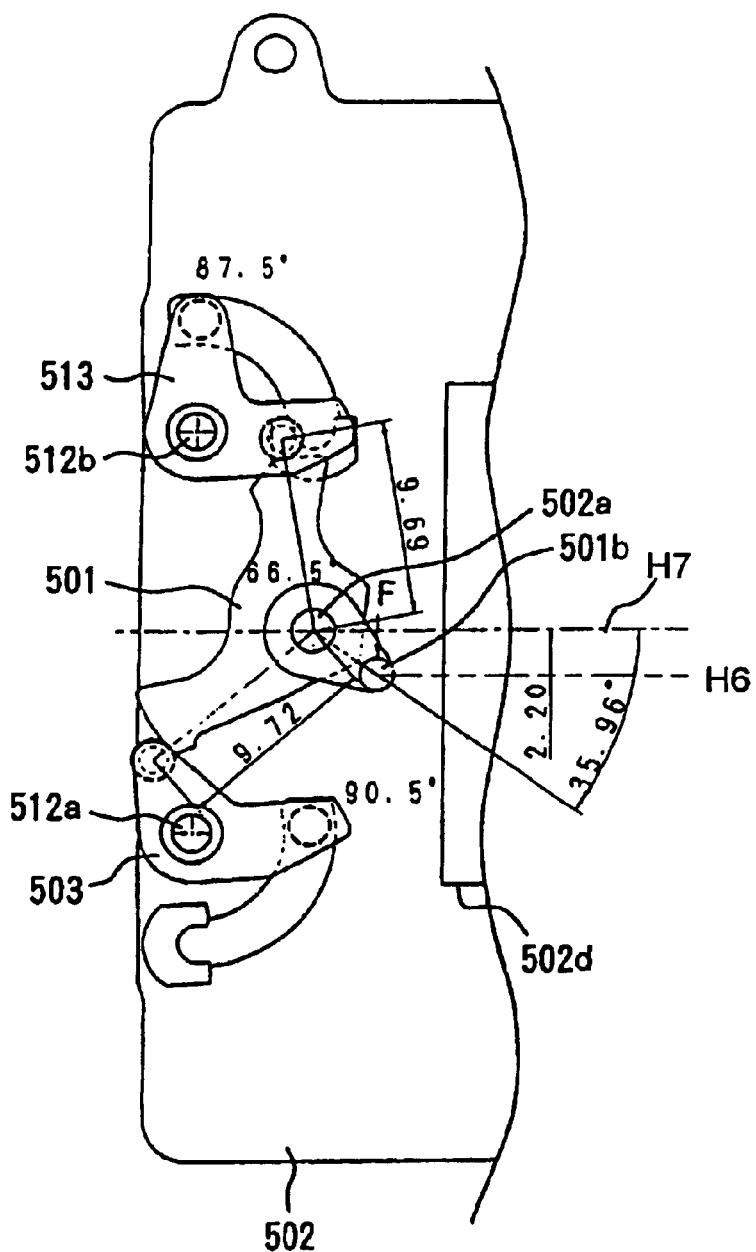
FIG. 36 is a front view of part of the conventional shutter apparatus in an overcharge state.

As is apparent from the same figure, compared to the state diagram of the second half charging state of the shutter apparatus using the conventional charge mechanism, the charging force is reduced by approximately 5%, the amount of overlapping between the front curtain and rear curtain (indicated by the distance between the slit formation portions 118e of the front curtain and the slit formation portion 122e of the rear curtain) is 6 mm, which is 1 mm greater than 5 mm of the conventional shutter apparatus (FIG. 32) and provides high light shielding performance.

Furthermore, in the state immediately before charging is completed in FIG. 19, the charge lever 101 rotates clockwise about the second axial portion 102a2 as the rotation axis and the front curtain has already completed charging.

Compared to the state immediately before charging is completed of the shutter apparatus using the conventional charge mechanism, the charging force is reduced by approximately 10% and the amount of overlapping between the front curtain and rear curtain in the middle of charging (indicated by the distance between the slit formation portions 118e of the front curtain and the slit formation portion 122e of the rear curtain) is 5.0 mm, which is 1.5 mm greater than 3.5 mm of the conventional shutter apparatus and provides high light shielding performance.

According to this embodiment, in the second half of charging the position of overlapping between the front curtain and rear curtain is above a shutter exposure aperture 102d. In the case of a single-lens reflex camera, a main mirror for splitting the optical path for the finder is normally provided on the image-taking lens side immediately before the shutter apparatus and the light shielding performance in the upper section of the shutter exposure aperture 102d where a hinge for the main mirror is provided is higher than that in the lower portion. Therefore, it is possible to reduce the amount of overlapping between the front curtain and rear curtain in the second half of charging.

Then, when the charge lever 101 has rotated a predetermined angle, an overcharge state is set as shown in FIG. 20 and the charging ends.

When the photographer presses the release button of a camera provided with the shutter apparatus and the camera starts an image-taking operation, power is supplied to the coils 126 and 130 of the timing control magnet and armatures 123 and 127 are attracted and held.

Then, as in the case of the charge mechanism according to this embodiment, the charge input lever (not shown) goes the opposite way of the charging process by the force of a return spring (mirror up spring, not shown), moves the main mirror (not shown) which is placed diagonally on the image-taking optical path away from the image-taking optical path to the image-taking position (mirror up). Caused by this mirror up, the charge lever 101 is restored to the charging start state by a returning mechanism (not shown) interlocked with the charge input lever.

The shutter is ready for running in this state, and after a predetermined exposure time the front curtain runs first, then the rear curtain runs to carry out an exposure operation. That is, after a predetermined exposure time, the power supply to the coils 126 and 130 is interrupted, the armatures 123 and 127 are released, the unfolded front curtain is folded to open the shutter exposure aperture 102d, while the folded rear curtain is unfolded to close the shutter exposure aperture 102d.

According to the above described configuration, the driving force transmission member starts charging when the distance between the rotation center and the point of contact with the front curtain driving lever is longer than the distance between the rotation center and the point of contact with the rear curtain driving lever and the distance between the rotation center and the point of contact with the rear curtain driving lever is set to be longer than the distance between the rotation center and the point of contact with the front curtain driving lever because the rotation center is switched midway through the process.

Adopting the above described configuration of this embodiment can provide a shutter apparatus including a charge mechanism having a greater degree of freedom in changing the charging phase between the front curtain and rear curtain than the conventional one, capable of shifting the peaks of the charging forces of the front curtain and rear curtain and thereby suppressing the peak of the overall charging force.

This embodiment has described the shutter apparatus provided with the charge mechanism according to the first embodiment, but it can also be adapted so as to mount the charge mechanism according to the second embodiment on the shutter apparatus.

According to the shutter apparatus of the above described embodiments, at least in the first half of a charge operation (that is, after charging is started until the rotation center of the driving force transmission member is switched), to take advantage of the fact that the distance between the rotation center and the point of contact with the front curtain driving lever is longer than the distance between the rotation center and the point of contact with the rear curtain driving lever, it is possible to drive the front curtain so that the amount of charging is greater than that of the rear curtain and drive the front curtain to close to the position at which charging is completed in an early stage after charging is started. That is, it is possible to increase the amount of overlapping of the slit formation portions of the front curtain and rear curtain in the middle of the charging and thereby improve the light shielding performance in the middle of charging.

On the other hand, in the second half of charging (that is, after the rotation center of the driving force transmission member is switched until charging is completed), to take advantage of the fact that the distance between the rotation center and the point of contact with the front curtain driving lever is shorter than the distance between the rotation center and the point of contact with the rear curtain driving lever, it is possible to drive the rear curtain so that the amount of charging is greater (so as to increase the driving speed) than that of the front curtain and drive it to close to the position at which charging is completed.

Furthermore, shortening the distance the point of contact between the charge input lever and the input portion travels sliding over the charge input lever can reduce the distance from the uppersurface (surface on which the output pin is laid) to the above described point of contact when charging is started and when charging is completed and further reduce tilting of the charge input lever and thereby reduce frictional loss.

Especially, the use of a small charge mechanism with improved efficiency can alleviate the component force in the axial direction during charging, and thereby reduce axial loss. Furthermore, the charge mechanism as described above can reduce displacement at the input end in the direction orthogonal to the direction of the input load and thereby improve the efficiency.

Reducing axial loss due to alleviation of the component force in the axial direction during charging can improve the efficiency of a charging and alleviate the charging load.

It also has the effects of reducing displacement at the input end in the direction orthogonal to the direction of the input load, further improving the efficiency and reducing the charging load. In addition, it also has the effect of reducing the size of the charge mechanism (in width direction).

It is further possible to keep the width of the shutter apparatus small, increase the amount of overlapping of the slit formation portions of the front curtain and rear curtain during charging and thereby improve the light shielding performance during charging.

Furthermore, incorporating the shutter apparatus according to the above described embodiments in a camera can provide a camera which has the above described effects.

What is claimed is:

1. A driving apparatus comprising:
   a driving source;
   a driven member;
   an energizing member which energizes the driven member in a predetermined direction;
   a lever member rotatable by receiving the driving force from the driving source at an input portion, which contacts and charges the driven member; and
   a main body which includes a first engaging portion and a second engaging portion and supports the lever member,
   wherein the lever member includes a first engaged portion which engages with the first engaging portion and a second engaged portion which engages with the second engaging portion, and
   the lever member is rotated around a first axis by engaging the first engaging portion and the first engaged portion with each other, and in the middle of rotation, the lever member is rotated around a second axis by engaging the second engaging portion and the second engaged portion with each other.

2. The driving apparatus according to claim 1, wherein the following expression is satisfied, $S>A+B$ where S is the sum total of rotation angles around the first axis and the second axis of the lever member,
   A is the angle formed by the straight line connecting the first engaging portion and the input portion at the start of charging and the straight line orthogonal to the direction of the force transmitted to the input portion,
   B is the angle formed by the straight line connecting the second engaging portion and the input portion when charging is completed and the straight line orthogonal to the direction of the force transmitted to the input portion.

3. The driving apparatus according to claim 1, further comprising a transmission member which contacts the input portion and transmits the driving force to the lever member.

4. The driving apparatus according to claim 1, wherein the distance between the first engaged portion and the input portion is substantially equal to the distance between the second engaged portion and the input portion.

5. The driving apparatus according to claim 1, wherein the first engaged portion and the second engaged portion are placed in such a way as to be substantially parallel to the direction of transmission of the driving force at the point of contact between the driven member and the lever member.

6. The driving apparatus according to claim 1, wherein the position of engagement between the first engaging portion and the first engaged portion is different from the position of engagement between the second engaging portion and the second engaged portion in the directions of the rotation axes of the lever member.

7. A driving apparatus comprising:
   a driving source;
   a driven member;
   an energizing member which energizes the driven member in a predetermined direction;
   a lever member rotatable by receiving the driving force from the driving source at an input portion, which contacts and charges the driven member; and
   a main body which includes a first engaged portion and a second engaged portion and supports the lever member,
   wherein the lever member includes a first engaging portion which engages with the first engaged portion and a second engaging portion which engages with the second engaged portion, and
   the lever member is rotated around a first axis by engaging the first engaging portion and the first engaged portion with each other, and in the middle of rotation, the lever member is rotated around a second axis by engaging the second engaging portion and the second engaged portion with each other.

8. The driving apparatus according to claim 7, wherein the following expression is satisfied, $S>A+B$ S is the sum total of rotation angles around the first axis and the second axis of the lever member,
   A is the angle formed by the straight line connecting the center of the first engaged portion and the input portion at the start of charging and the straight line orthogonal to the direction of the force transmitted to the input portion,
   B is the angle formed by the straight line connecting the center of the second engaged portion and the input portion when charging is completed and the straight line orthogonal to the direction of the force transmitted to the input portion.

9. The driving apparatus according to claim 7, further comprising a transmission member which contacts the input portion and transmits the driving force to the lever member.

10. The driving apparatus according to claim 7, wherein the distance between the first engaging portion and the input portion of the lever member is substantially equal to the distance between the second engaging portion and the input portion of the lever member.

11. The driving apparatus according to claim 7, wherein the first engaging portion and the second engaging portion are placed in such a way as to be substantially parallel to the direction of transmission of the driving force at the point of contact between the driven member and the lever member.

12. The driving apparatus according to claim 7, wherein the position of engagement between the first engaging portion and the first engaged portion is different from the position of engagement between the second engaging portion and the second engaged portion in the directions of the rotation axes of the lever member.

13. A shutter apparatus comprising:
    a driving source;
    a front curtain constructed of a plurality of blades;
    a rear curtain constructed of a plurality of blades;
    a first driving lever which drives charging of the front curtain;
    a second driving lever which drives charging of the rear curtain; and
    a driving force transmission member rotatable by receiving the driving force from the driving source, which includes a first arm portion which contacts the first driving lever and transmits the driving force and a second arm portion which contacts the second driving lever and transmits the driving force,
    wherein the driving force transmission member starts charging when the distance between the rotation center and the point of contact with the first driving lever is greater than the distance between the rotation center and the point of contact with the second driving lever and is set through switching of the rotation center at some midpoint so that the distance between the rotation center and the point of contact with the second driving lever is greater than the distance between the rotation center and the point of contact with the first driving lever.

14. The shutter apparatus according to claim 13, wherein one of the driving force transmission member and the main body which supports the driving force transmission member includes a first engaging portion and a second engaging portion, the other includes a first engaged portion and a second engaged portion which engage with the first engaging portion and second engaging portion, the driving force transmission member is rotated around first axis by engaging the first engaging portion and the first engaged portion with each other and, in the middle of rotation, is rotated around second axis by engaging the second engaging portion and the second engaged portion with each other, and the driving force transmission member rotates about the first axis, starts charging when the distance between the first engaging portion and the point of contact with the first driving lever is greater than the distance between the first engaging portion and the point of contact with the second driving lever and is set through switching the rotation axis of the driving force transmission member from the first axis to the second axis so that the distance between the second engaging portion and the point of contact with the second driving lever is greater than the distance between the second engaging portion and the point of contact with the first driving lever.

15. A camera comprising the shutter apparatus according to claim 13.

* * * * *

UNITED STATES PATENT AND TRADEMARK OFFICE
CERTIFICATE OF CORRECTION

PATENT NO. : 6,835,007 B2
DATED : December 28, 2004
INVENTOR(S) : Yasuhiro Toyoda It is certified that error appears in the above-identified patent and that said Letters Patent is hereby corrected as shown below:

Column 18,
Line 47, delete "pass d" and insert -- passed --.

Signed and Sealed this

Twenty-eighth Day of March, 2006

JON W. DUDAS
*Director of the United States Patent and Trademark Office*